(12) United States Patent
Nakajima et al.

(10) Patent No.: US 6,317,187 B1
(45) Date of Patent: Nov. 13, 2001

(54) LIQUID CRYSTAL LIGHT VALVE APPARATUS IN WHICH THE SPACERS HAVING PROTRUSION AND RECESS

(75) Inventors: Hideharu Nakajima; Toyoharu Oohata, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/467,883

(22) Filed: Dec. 21, 1999

(30) Foreign Application Priority Data

Dec. 25, 1998 (JP) ................................................ 10-370846

(51) Int. Cl.⁷ ......................... G02F 1/1339; G02F 1/1333
(52) U.S. Cl. ............................................. 349/155; 349/110
(58) Field of Search .................................... 349/155, 157, 349/110, 111, 156

(56) References Cited

U.S. PATENT DOCUMENTS

| | | | |
|---|---|---|---|
| 5,583,676 | * 12/1996 | Akiyama et al. | 349/28 |
| 5,699,135 | * 12/1997 | Hisatake et al. | 349/113 |
| 5,757,451 | * 5/1998 | Miyazaki et al. | 349/106 |
| 5,917,572 | * 6/1999 | Kurauchi et al. | 349/156 |
| 5,978,061 | * 11/1999 | Miyazaki et al. | 349/155 |

* cited by examiner

*Primary Examiner*—Kenneth Parker
*Assistant Examiner*—Mike Qi
(74) *Attorney, Agent, or Firm*—Sonnenschein, Nath & Rosenthal

(57) ABSTRACT

A liquid crystal light valve includes a first substrate having a function element and an orientation film formed on a first base, a second substrate having an opposed electrode and an orientation film formed on a second base opposed to the first substrate, a spacer disposed at a predetermined position between the first substrate and the second substrate, a liquid crystal layer filled between the first substrate and the second substrate, and a light shielding area provided on an incident light side from end portion of the spacer located to the second substrate side, in which at least a part of outer periphery of a two-dimensional shape, which is obtained by projection a section of the spacer perpendicular to the optical axis of the incident light in at least a part of height in the optical axis direction of the incident light on the light shielding area in parallel to the optical axis, is contained in the light shielding area. As a result, a light leak due to liquid crystal molecules located near the pillar-shaped spacer and disturbed in orientation can be prevented and hence the contrast can be increased.

32 Claims, 12 Drawing Sheets

FIG. 1 --PRIOR ART--
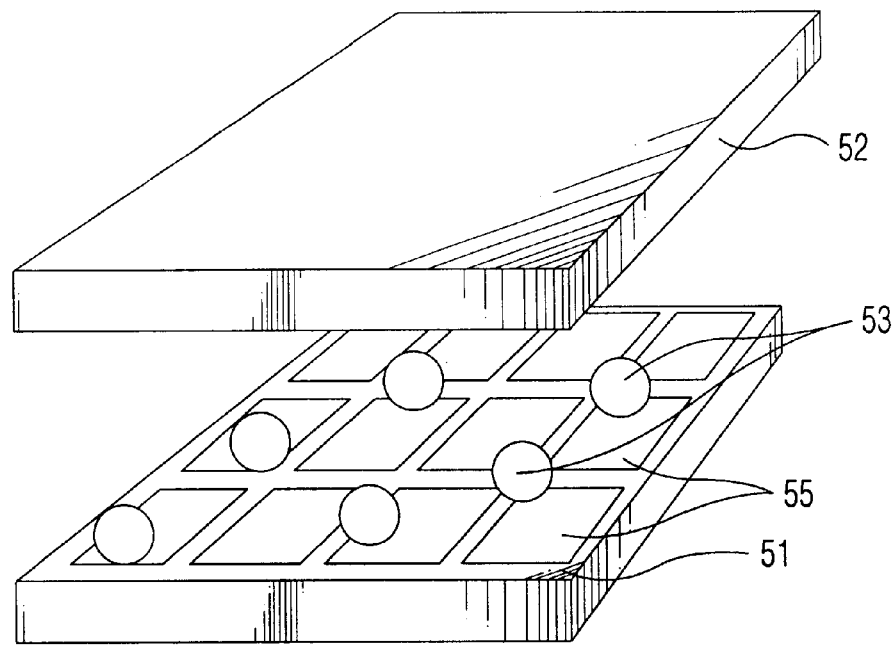
FIG. 2 --PRIOR ART--
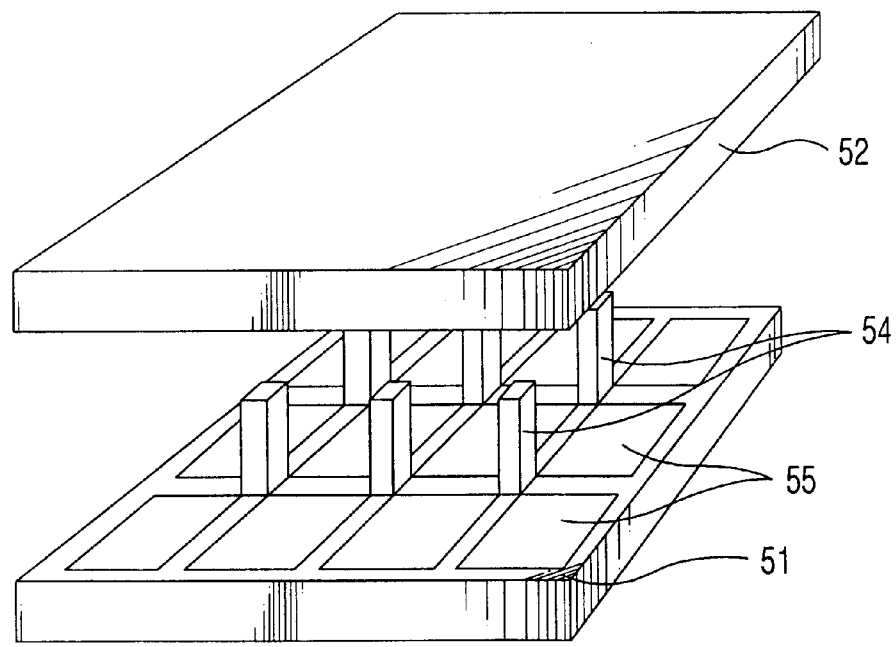

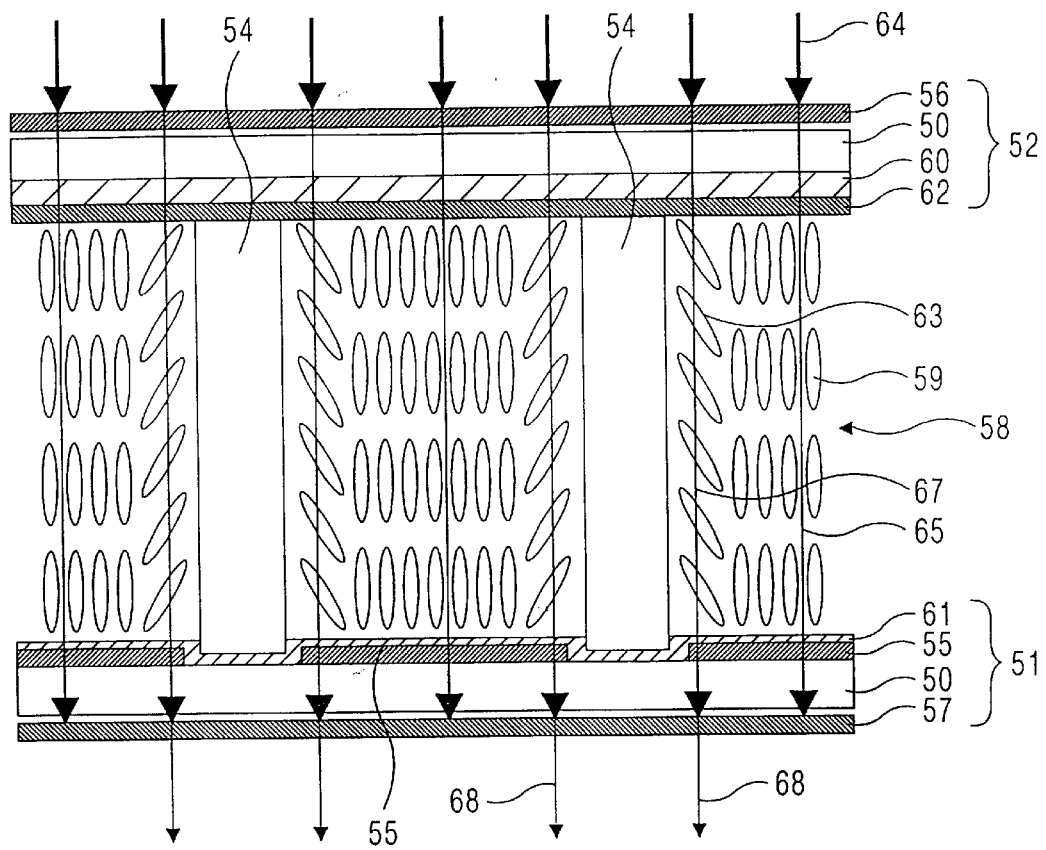
FIG. 3 --PRIOR ART--
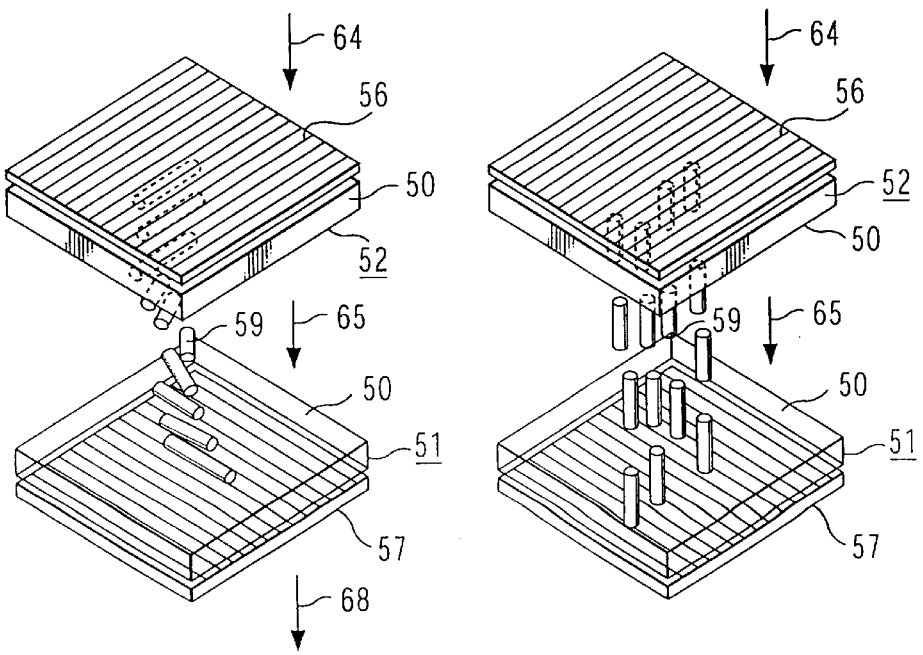
FIG. 4A --PRIOR ART--   FIG. 4B --PRIOR ART--

LIQUID CRYSTAL LIGHT VALVE APPARATUS IN WHICH THE SPACERS HAVING PROTRUSION AND RECESS

BACKGROUND OF THE INVENTION

1. Field of the Invention

The present invention relates to a liquid crystal light valve apparatus, and in particular to a liquid crystal light valve apparatus which improves a contrast to thereby improve an image quality.

2. Description of the Related Art

A liquid crystal light valve (LCLV) apparatus is an optical to optical image converter. A light valve is such an apparatus adapted to being capable of receiving a light which is low in light intensity, reading out its optical image on real time by using a light fed from another light source, and output the image. Hereafter, a liquid crystal light valve apparatus is also referred to simply as a liquid crystal light valve.

The liquid crystal light valves are classified into a transmission type and a reflection type.

In the reflection type, there is used an active matrix scheme in which a signal is supplied from an output terminal to each pixel to turn on or off each pixel, and a light writing-in scheme in which light writing is conducted on a photoconductive layer from a rear face side opposite to its output.

On the other hand, in the transmission type, only the active matrix scheme is used.

The fact common to the above described three schemes is that a liquid crystal layer is interposed between opposed electrodes.

In order to make birefringence of the liquid crystal layer in these liquid crystal light valves constant in a pixel area, therefore, the spacing between both substrates having electrodes opposed to each other via the liquid crystal layer needs to be kept constant.

For the purpose of keeping the spacing between the substrates constant, a spacer is provided.

Heretofore, a method shown in FIG. 1 has been used. On a first substrate 51 having function elements such as a transistor or the like formed thereon, globular beads 53 having uniform diameters are scattered. A second substrate 52 having an opposed electrode formed thereon is stuck to the scattered beads 53.

In this method, however, the beads 53 serving as the spacer are scattered also on pixel electrodes 55. Therefore, shadows of the beads 53 appear in a projected image. In addition, random distribution of the shadows of the beads 53 causes conspicuousness. This results in a problem of degraded image quality.

In order to eliminate the shadows of the beads 53, therefore, there is widely used such a method that the spacers 53 are not disposed in the image display area. According to the method, when adhering the peripheral portions of the substrates, spacers are added to the bonding agent thereof t o form the spacing.

In this case, the surface flatness of both substrates on the side contacting the liquid crystal layer needs to be limited to, for example, 0.3 $\mu$m or less over the whole image display area.

As a matter of fact, however, a glass substrate, a semiconductor substrate or the like having a thickness of 1.1 mm or less widely used as a liquid crystal glass substrate is easily bent by stress of a thin film electrode layer such as metal or the like, a semiconductor film such as amorphous silicon or the like, and an insulation film or the like formed thereon.

Therefore, the above described method of forming the spacer only around the periphery of glass has been put to practical use only in the case where the liquid crystal light valve apparatus is small with a surface area comprised of the above described pixel display area and a peripheral portion thereof being equal to or less than 30 mm in each side length and in addition the error allowance of the substrate spacing is comparatively large, such as in the case of the so-called twist pneumatic oriented normally white mode of transmission type.

In other words, in the case where the error allowance of the spacing is small as in a liquid crystal light valve having many pixels and a large display area, a liquid crystal light valve of reflection type using an electrically controlled birefringence (ECB) mode and so on, it is difficult to apply the above described method of forming the spacers only in the periphery of glass and it becomes necessary to dispose spacers in the display area.

In order to dispose the spacers so as not to make the shadows of the spacers inconspicuous, therefore, it is made necessary to dispose the spacers selectively only the portion between pixels.

And there is being studied a method of forming a so-called pillar-shaped spacer 54 by using registering a as self alignment with respect to pixel electrodes 55 forming pixels, for example, as shown in FIG. 2.

FIG. 3 shows a schematic sectional view of a conventional liquid crystal light valve of transmission type.

This liquid crystal light valve of transmission type has the following configuration. A first substrate 51 is formed by forming pixel electrodes 55 divided so as to be associated with respective pixels, on an internal surface of a base substrate 50 made of, for example, glass and forming an orientation film 61 over the entire internal surface so as to cover the pixel electrodes 55. A second substrate 52 is formed by forming opposed electrodes 60 on an internal surface of a base substrate 50 made of, for example, glass and forming an orientation film 62 over the entire internal surface so as to cover the opposed electrodes 60. The first substrate 51 and the second substrate 52 are disposed so as to be opposed to each other via pillar-shaped spacers 54. In addition, the peripheral portions of the substrates 51 and 52 are hermetically sealed, and a liquid crystal layer 58 is formed between the substrates 51 and 52. The liquid crystal light valve of transmission type has thus been formed.

If in FIG. 3 the pixel electrodes 55 of the first substrate 51 are made of a material having a high light reflection factor such as Al, Cr, W or the like, or alternatively a dielectric multi-layer reflection film or the like is disposed between the pixel electrodes 55 and the liquid crystal layer 58, then a liquid crystal light valve of reflection type is directly obtained.

Especially, in order to sink the wholly black state, i.e., make the wholly black state blacker in the liquid crystal light valve of FIG. 3, for example, a polarization plate 56 and a analyzer plate 57 are respectively disposed on the first and second substrates 51 and 52 so as to satisfy the orthogonal Nicol relation. Directions of the orientation films 61 and 62 respectively provided on the pixel electrodes 55 and the opposed electrodes 60 which are in turn provided on opposed sides respectively of the substrates 51 and 52 are made the same as those of the polarization plate 56 and the analyzer plate 57, respectively. Between the orientation films 61 and 62, a liquid crystal is injected.

Operation of this liquid crystal light valve is shown in FIGS. 4A and 4B.

In a state of FIG. 4A in which any voltage is not applied between both the electrodes 55 and 60 in the above described configuration, incident light 64 applied to the liquid crystal panel passes through the polarization plate 56, becomes a linearly polarized light 65, optically rotates along the twist of liquid crystal molecules 59, and passes through the analyzer plate 57 as it is. This results in a bright state.

On the other hand, in a state of FIG. 4B in which a voltage is applied between the electrodes 55 and 60, the liquid crystal molecules 59 are oriented vertically. Irrespective of its wavelength, therefore, the linearly polarized light 65 through the polarization plate 56 cannot pass through the analyzer plate 57 disposed perpendicular to the polarization plate 56. As a result, the wholly black state can be implemented.

The configuration conducting the above described operation is in the bright state when no voltage is applied, and hence its operation mode is called a normally white mode. Since the wholly black state can be implemented irrespective of the light wavelength, this configuration recently tends to be adopted in many cases.

When the above described spacers 54 are disposed between the first and second substrates 51 and 52, and the liquid crystal molecules 59 are vertically oriented in the wholly black state, liquid crystal molecules 63 located around the pillar-shaped spacers 54 are subject to intermolecular attraction between them and the pillar-shaped spacers 54 and their orientation directions are disturbed as shown in the sectional view of FIG. 3.

At this time, light 67 passed through the vicinity of the pillar-shaped spacers 54 is subject to birefringence due to the liquid crystal molecules 63 deviated from the vertical orientation. As a result, the polarization direction of the light 67 is partially rotated. A part of the light 67 thus passes through the analyzer plate 57, resulting in a light leak 68.

As the liquid crystal light valve, therefore, the wholly black display cannot be made completely black. As a result, the contrast is significantly lowered. A countermeasure against this is needed.

In an alternative configuration of the liquid crystal light valve of reflection type, a liquid crystal of negative type is used and consequently the liquid crystal molecules are oriented perpendicular to the substrates when no voltage is applied between the electrodes 55 and 60. Furthermore, polarization beam splitters (PBS) may be used instead of the polarization plate 56 and the analyzer plate 57.

This PBS has a function of reflecting only a certain polarized light component of the incident light and passing other components through it. FIG. 5 is a schematic diagram of an optical system formed by using a liquid crystal light valve of reflection type. As shown in FIG. 5, a liquid crystal light valve 25, a light source 24, and a projection optical system 22 are disposed around the PBS.

The case where a voltage is applied in this state between the electrodes 55 and 60 (see FIG. 3) having a liquid crystal layer interposed between will now be described. A light emitted from the light source 24 and passed through a lighting optical system 28 becomes a linearly polarized light, such as, for example, a light having a polarization direction perpendicular to paper of the drawing by being passed through the PBS 23, and the n irradiated on the liquid crystal light valve 25 to enter the liquid crystal layer 58. Although not illustrated, the liquid crystal molecules 59 of the liquid crystal layer 58 (see FIG. 3) are inclined from the vertical orientation to a direction parallel to the substrate surface by the application of the voltage at this time.

At this time, the incident light is passed through the inside of the liquid crystal layer 58 and reflected on a pixel surface. Or in the light writing scheme, the incident light is reflected on a reflection film such as a dielectric reflection film or the like provided on the pixel surface. As a result, the reflected light is passed through the liquid crystal layer 58 again. Since the liquid crystal molecules 59 are inclined, the reflected light is influenced by the birefringence during this time. As a result, there is obtained an output light having a polarization state different from that of the incident light which is linearly polarized light, such as, for example, light having a component in a direction perpendicular to the paper of the drawing and a component in a lateral direction.

When this light enters the PBS 23 again, a light component 31 changed in polarization state, such as, for example, only the component in the lateral direction is passed through the PBS 23 and the projection optical system 22, and finally led to a projection screen 21.

On the other hand, if the voltage is not applied between both the electrodes, then the liquid crystal molecules remain in the vertical orientation. Therefore, the incident light is reflected in the liquid crystal light valve 25 while remaining linearly polarized, put out from the liquid crystal light valve apparatus 25, and returned to the PBS 23. However, this light is not influenced in the liquid crystal layer 58 by the above described birefringence.

Therefore, the direction of the linearly polarized light of the incident light is not changed. As a result, the light returned to the PBS 23 is returned to the light source 24 as it is. Since there is no light entering the projection optical system 22, black display is incurred. This is called the normally black mode.

At this time, intermolecular attraction is exerted between the liquid crystal molecules located in the vicinity of the pillar-shaped spacer 54 and the pillar-shaped spacer 54. Therefore, the liquid crystal molecules located in the vicinity of the pillar-shaped spacer 54 are inclined from the vertical orientation which is the original orientation of the liquid crystal to the horizontal direction which is parallel to the substrates 51 and 52. Thereupon, the light passed through this area, such as, for example, the linearly polarized light is subjected to birefringence in the liquid crystal layer. When the light goes through and returns to the liquid crystal layer 58 and leaves the liquid crystal light valve apparatus 25, its polarization has already been changed. When this light has entered the PBS 23, a light of a component different from the original linearly polarized light is passed through the PBS 23, and projected onto the screen 21 via the projection optical system 22. In the same way as the above described configuration of the normally white mode, the so-called light leak is caused.

In other words, on a picture on the screen 21 which should originally be wholly black, vicinities of the pillar-shaped spacers 54 shine. As a result, the contrast ratio of the wholly black state to the maximum luminance is lowered and the quality of video images is degraded.

This problem appears significantly especially in a liquid crystal light valve of reflection type improved in light utilization factor by putting the pixel electrodes close together and thereby reducing invalid areas, when regulation force for obtaining the vertical orientation is received from the orientation film and appears remarkably when the regulation force does not depend upon the electric field.

Whether the configuration is that of the normally white mode or that of the normally black mode, therefore, there is a problem that the light leak is caused by the disturbance of orientation of the liquid crystal molecules in the vicinity of the pillar-shaped spacers.

SUMMARY OF THE INVENTION

An object of the present invention is to provide a liquid crystal light valve capable of preventing light leak caused by liquid crystal molecules which are located in the vicinity of the pillar-shaped spacers provided to make the thickness of the liquid crystal layer constant and which are disturbed in orientation, capable of simplifying the fabrication process as far as possible, capable of being formed with high reproducibility, capable of having a high contrast and a high image quality, capable of having a high productivity and a high yield, and capable of being produced with a reduced fabrication cost.

A liquid crystal light valve according to the present invention includes a first substrate having an function element and an orientation film formed on at least first base, a second substrate having an opposed electrode and an orientation film formed on a second base disposed so as to be opposed to the first substrate, a spacer disposed at a predetermined position between the first substrate and the second substrate, a liquid crystal layer filled between the first substrate and the second substrate, and a light shielding area provided from an end portion of an spacer on the second substrate side to an incident light side, wherein at least a part of outer periphery of a two-dimensional shape, which is obtained by projection a section of the spacer perpendicular to the optical axis of the incident light in at least a part of height in the optical axis direction of the incident light on the light shielding area in parallel to the optical axis, is contained in the light shielding area.

In the above described configuration of the present invention, a light shielding area is provided from an end portion of a spacer on the second substrate side to the light incident side in which at least a part of outer periphery of a two-dimensional shape, which is obtained by projection a section of the spacer perpendicular to the optical axis of the incident light in at least a part of height in the optical axis direction of the incident light on the light shielding area in parallel to the optical axis, is contained in the light shielding area. By this light shielding area, a light passing through an area of liquid crystal molecules located near the spacer and disturbed in orientation can be intercepted. As a result, a leak light is not emitted as a readout light. Accordingly, floating of the wholly black state can be prevented.

Furthermore, in accordance with the present invention, in the above described liquid crystal light valve, the optical axis direction of the incident light is a direction perpendicular to a virtual plane obtained by averaging a surface of the orientation film of the second substrate where the orientation film contacts the liquid crystal layer.

Furthermore, in accordance with the present invention, in the above described liquid crystal light valve, out of the periphery of the two-dimensional shape obtained by projecting a section of the associated spacer, a part which is not contained in the light shielding area is less than 50% of a whole periphery length, and such an area that the two-dimensional shape obtained by projecting a section of the associated spacer is outside the light shielding area is a range less than 50% of the height of the spacer aligned with the optical axis direction of the incident light.

Furthermore, in accordance with the present invention, in the above described liquid crystal light valve, over a whole area of the associated spacer in the optical axis direction of the incident light, at least a part of the periphery of the two-dimensional shape obtained by projecting a section of the associated spacer is contained in each light shielding area.

Furthermore, in accordance with the present invention, in the above described liquid crystal light valve, out of the periphery of the two-dimensional shape obtained by projecting a section of the associated spacer, a part which is not contained in the light shielding area is less than 50% of a whole periphery length.

Furthermore, in accordance with the present invention, in the above described liquid crystal light valve, in at least a part of area in the height of the spacer aligned with optical axis direction of the incident light, the two-dimensional shape obtained by projecting a section of the associated spacer is wholly contained in each light shielding area.

Furthermore, in accordance with the present invention, in the above described liquid crystal light valve, such an area that the two-dimensional shape obtained by projecting a section of the associated spacer is not contained in the light shielding area is made less than 50% of the whole height of the spacer.

Furthermore, in accordance with the present invention, in the above described liquid crystal light valve, in a whole area in the height of the spacer aligned with optical axis direction of the incident light, the two-dimensional shape obtained by projecting a section of the associated spacer is wholly contained in each light shielding area.

Furthermore, in accordance with the present invention, in the above described liquid crystal light valve, at least a part of a surface of the spacer where the spacer contacts the first substrate is located between pixel electrodes provided on a surface of the first substrate.

Furthermore, in accordance with the present invention, in the above described liquid crystal light valve, the function element is made to be able to electrically adjust a light transmission factor of each pixel, and the liquid crystal light valve is such a liquid crystal light valve of transmission type that a readout light injected from the first substrate side is modulated through the second substrate, transmitted and emitted.

Furthermore, in accordance with the present invention, in the above described liquid crystal light valve, the function element is made to be able to change a reflection factor of each pixel for the incident light in response to a voltage individually given from an output terminal, and the liquid crystal light valve is such a liquid crystal light valve of reflection type that a readout light injected from the outside of the second substrate is modulated when it is reflected on the first substrate according to a change of the reflection factor, and emitted through the second substrate.

Furthermore, in accordance with the present invention, in the above described liquid crystal light valve, the function element is made to conduct a light writing on a photoconductive layer formed in a pixel area located on a rear surface of the first substrate and thereby change a property of the photoconductive layer, and the liquid crystal light valve is such a liquid crystal light valve of reflection type that a readout light injected from the outside of the second substrate is modulated when it is reflected on the first substrate according to a change of the property of the photoconductive layer, and emitted through the second substrate.

Furthermore, in accordance with the present invention, in the above described liquid crystal light valve, the light shielding area is formed of a light reflective material which does not transmit a light.

Furthermore, in accordance with the present invention, in the above described liquid crystal light valve, the light shielding area is formed of a dielectric reflection film.

Furthermore, in accordance with the present invention, in the above described liquid crystal light valve, the dielectric reflection film is formed by stacking two light transmission layers differing in refractive index with a thickness equal to a ¼ of a wavelength of the incident light.

Furthermore, in accordance with the present invention, in the above described liquid crystal light valve, the light shielding area is formed of a light absorbing material which does not transmit a light.

Furthermore, in accordance with the present invention, in the above described liquid crystal light valve, the light shielding area is formed by stacking a light transmission film on a light absorbing material.

Furthermore, in accordance with the present invention, in the above described liquid crystal light valve, the light transmission film is formed by stacking two light transmission layers differing in refractive index with a thickness equal to a ¼ of a wavelength of the incident light.

Furthermore, in accordance with the present invention, in the above described liquid crystal light valve, the light shielding area is formed by stacking a light reflective material on a light absorbing material.

Furthermore, in accordance with the present invention, in the above described liquid crystal light valve, the light shielding area is formed by stacking a light reflective material and a dielectric reflection film on a light absorbing material.

Furthermore, in accordance with the present invention, in the above described liquid crystal light valve, the light shielding area is formed of a light scattering material.

Furthermore, in accordance with the present invention, in the above described liquid crystal light valve, the spacer has a sectional shape of any one of a circle, an ellipse or a rhomb, or spacer is formed by stacking a plurality of structures each having one of these structures.

Furthermore, in accordance with the present invention, in the above described liquid crystal light valve, the spacer and the light shielding area are formed of the same material.

Furthermore, in accordance with the present invention, in the above described liquid crystal light valve, the spacer and the light shielding area are formed of the same material.

BRIEF DESCRIPTION OF THE DRAWINGS

FIG. 1 is a perspective view of a conventional liquid crystal light valve;

FIG. 2 is a perspective view of a liquid crystal light valve using a pillar-shaped spacer;

FIG. 3 is a schematic sectional view of a conventional liquid crystal light valve of transmission type;

FIG. 4A is a schematic diagram showing operation of a conventional liquid crystal light valve of transmission type conducted when no voltage is applied;

FIG. 4B is a schematic diagram showing operation of the conventional liquid crystal light valve of transmission type conducted when a voltage is applied;

DETAILED DESCRIPTION OF THE PREFERRED EMBODIMENTS

Prior to description of concrete embodiments according to the present invention, summary of the present invention will now be described.

In the present invention, a light shielding area substantially larger in section than each pillar-shaped spacer is formed on the incident light side of the pillar-shaped spacer, for the purpose of suppressing the light leak caused by the liquid crystal molecules located in the vicinity of the pillar-shaped spacer and disturbed in orientation.

As the material for the light shielding area, a material which does not transmit the light incident upon the liquid crystal light valve is used. The light shielding area is formed so as to become, for example, plate-like.

It is now assumed that a two-dimensional shape, which is obtained by projecting a section of the pillar-shaped spacer perpendicular to the optical axis direction of the incident light onto the light shielding area in parallel to the optical axis direction, is in its almost part contained in the light shielding area.

Such a configuration as to contain the whole periphery of the section of the spacer in the light shield area is desirable, because the incident light does not pass at all the vicinity of the liquid crystal molecules disturbed in orientation and consequently the light leak can be suppressed most efficiently.

Even if a part of the spacer is not contained in the light shielding area, however, an effect of suppressing the light leak significantly can be obtained and the contrast can be made high, provided that a great part, such as, for example, equal to or more than 50% of the whole periphery of the section of the spacer or an area of equal to or more than 50% of the whole height of the spacer is contained.

Hereafter, an concrete embodiment of the present invention will be described.

Figure 5:
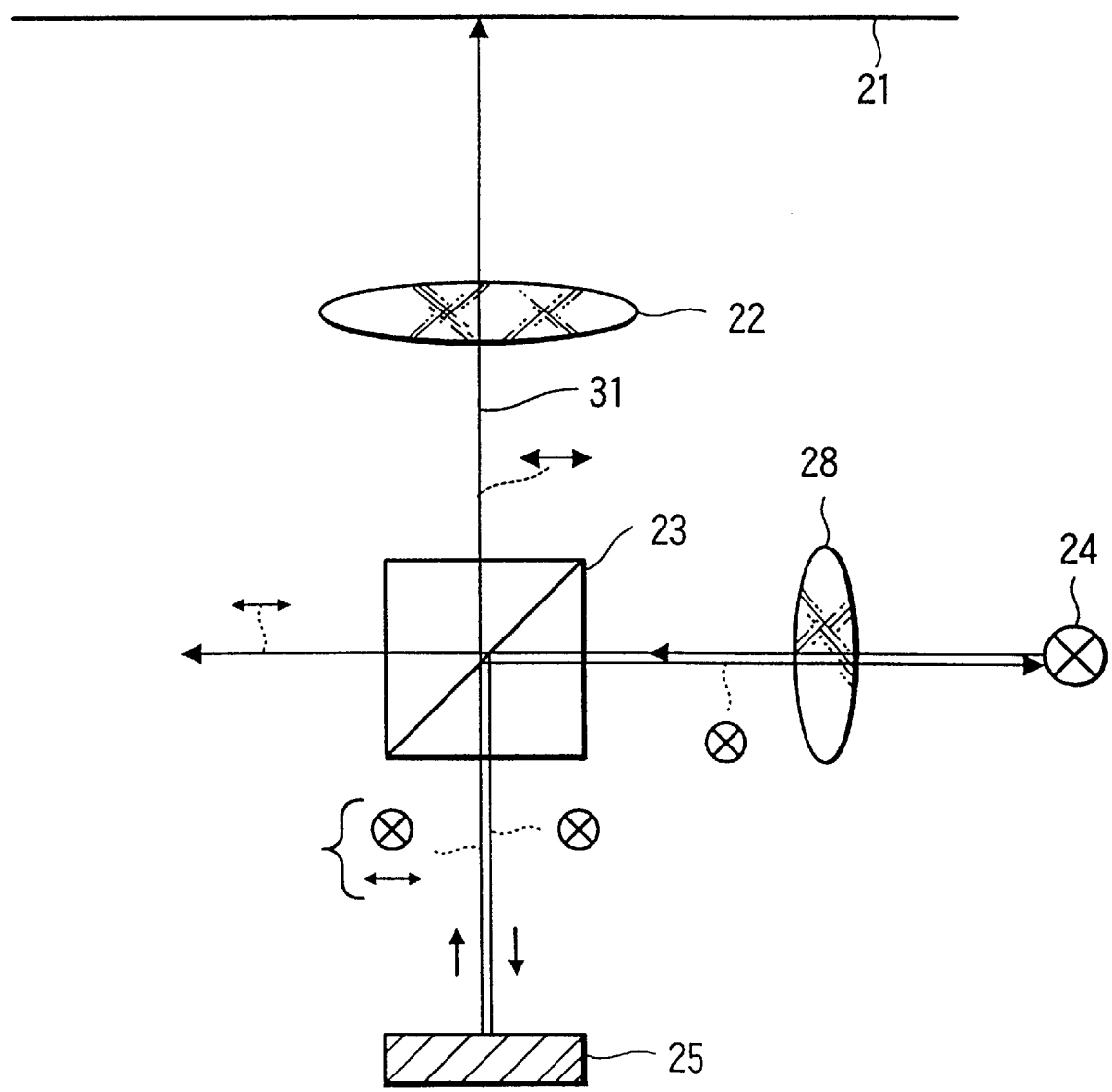
FIG. 5 is a schematic diagram of an optical system formed by using a liquid crystal light valve of reflection type.
Figure 6:
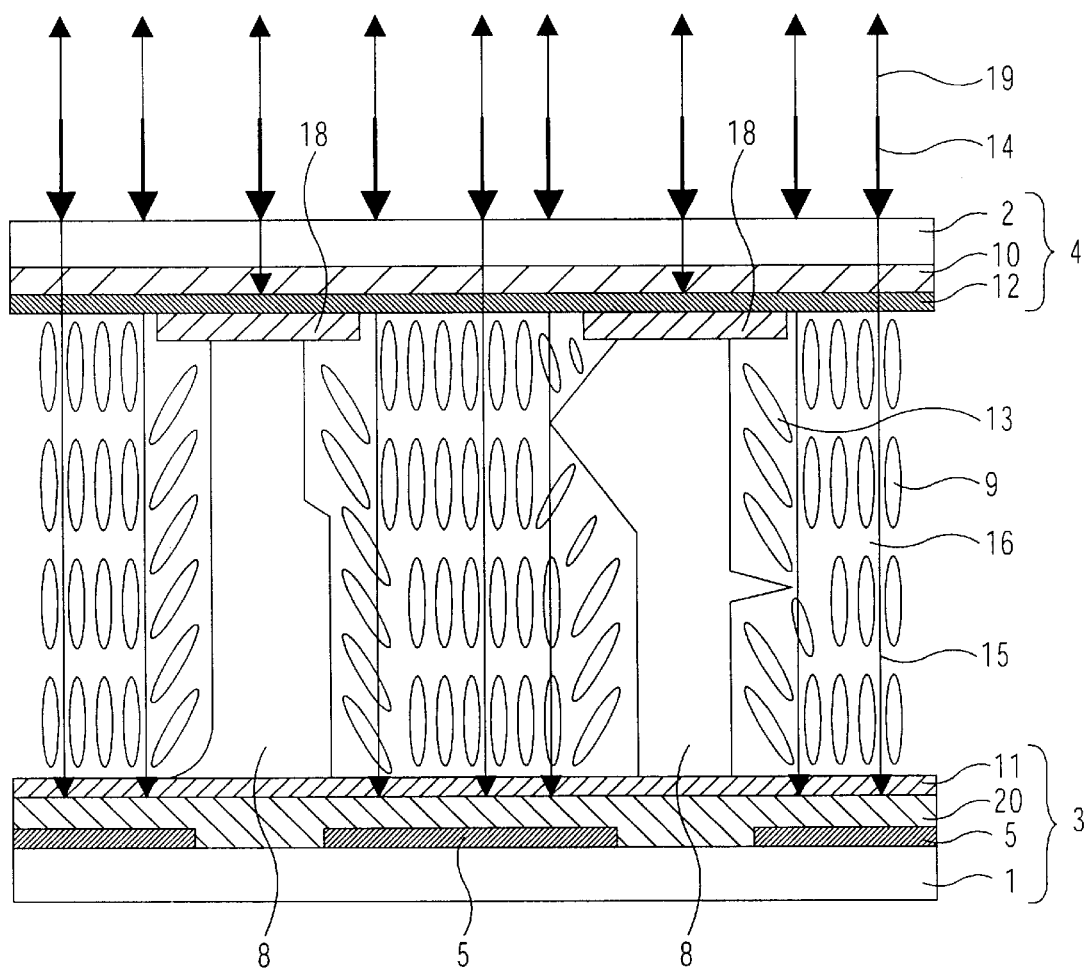
FIG. 6 is a schematic sectional view of an embodiment of a liquid crystal light valve of reflection type according to the present invention.

FIG. 6 is a schematic sectional view of an embodiment of the liquid crystal light valve of reflection type according to the present invention. The embodiment shown in FIG. 6 shows the case where the present invention is applied to a liquid crystal light valve apparatus of reflection type using an active matrix method.

In this liquid crystal light valve, an electrode layer 5 is formed on a first base 1 made of, for example, glass. The electrode layer 5 is divided as function elements so as to be associated with respective pixels and form pixel electrodes. A dielectric reflection film 20 is formed so as to wholly cover the electrode layer 5. On this dielectric reflection film 20, an orientation film 11 is formed. In this way, a first substrate 3 is formed.

In addition, pillar-shaped spacers 8 are formed on the orientation film 11.

Furthermore, on a second base 2 formed of, for example, glass, an electrode layer 10 functioning as opposed electrodes is formed. An orientation film 12 is formed so as to wholly cover the electrode layer 10. In this way, a second substrate 4 is formed.

Figure 7:
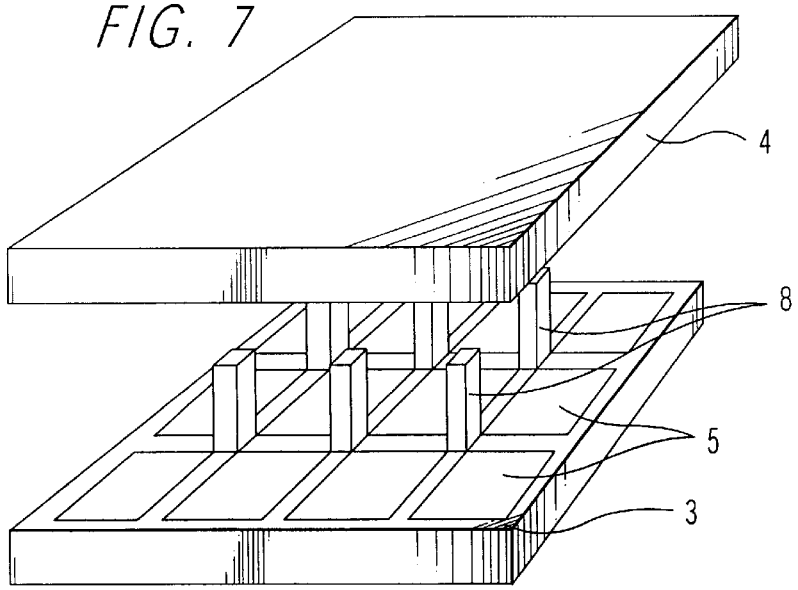
FIG. 7 is a schematic perspective view of an embodiment of a liquid crystal light valve of reflection type according to the present invention.

As shown in a perspective view of FIG. 7, the orientation films 11 and 12 of the first substrate 3 and the second substrate 4 are respectively opposed to each other, and placed in a vacuum. In such a state that the spacing between the substrates 3 and 4 is kept at a predetermined value by the pillar-shaped spacers 8 disposed between pixels, i.e., between the pixel electrodes 5, a liquid crystal is injected thereinto.

Subsequently, by sealing the periphery thereof, a liquid crystal layer 16 is formed. A liquid crystal light valve apparatus is thus formed.

The electrode layer (pixel electrodes) 5 on the first base 1 is formed in, for example, a lattice pattern formed selectively so as to be associated with pixels on the first base 1.

The dielectric reflection film 20 can be formed by using the so-called dielectric mirror using an ordinary multi-layer structure. The orientation film 11 formed thereon can also be made by using an ordinary configuration.

The electrode layer (pixel electrodes) 5 of the first substrate 3 forming function elements has such a configuration that the reflection factor of each pixel with respect to an incident light thereupon can be changed by individually applying a voltage thereto from an external terminal via a switching element such as a TFT (thin film transistor) or the like.

By virtue of this configuration, a readout light (incident light) 14 injected from the outside of the second substrate 4 is passed through the liquid crystal layer 16 (as represented by 15 in FIG. 6), modulated when reflected on the dielectric reflection film 20 of the first substrate 3 as a result of the change of the reflection factor mentioned above, and emitted through the second substrate 4 (as represented by 19 in FIG. 6).

In other words, a liquid crystal light valve of reflection type using the active matrix scheme is thus formed.

The pillar-shaped spacers 8 formed on the first substrate 3 can be formed by using an ordinarily used material such as a resin or the like. The material is not especially restricted so long as it can be formed in a pillar shape as described above.

Although each of the spacers 8 shown in FIG. 7 has a rectangular shape in section, it may have a different shape such as a circle, an ellipse, or a rhomb. Or by stacking a plurality of structures each having one of these structures, the spacer 8 may be formed.

And in the present embodiment, a light shielding plate 18 is provided on the incident light side of each of the pillar-shaped spacers 8, i.e., on the second substrate 4 side as the above described light shielding area.

As for the material of the light shielding plate 18, a film of metal such as Cr, W, Al, Ni, Cu, Ti or the like may be used.

It is now assumed in the present embodiment that a two-dimensional shape, which is forme by projecting a section of the spacer 8 perpendicular to an optical axis direction of the incident light 14 (i.e., a direction perpendicular to the second substrate 4 in this case) in parallel to the optical axis direction, is contained in the light shielding plate 18 in many areas as shown in FIG. 6. However, a part of the two-dimensional shape is not contained in the light shielding plate 18.

In other words, in a left-hand spacer 8 shown in FIG. 6, a portion contacting the orientation film 11 of the first substrate 3 is not contained in the light shielding plate 18. In a right-hand spacer 8, a right-hand portion located at the center in the height direction and a left-hand portion located at nearly one fourth of the height from the top in the height direction are not contained in the light shielding plate 18.

At this time, there is a fear that the linearly polarized light may pass through an area located near a portion of the spacer 8 protruding to the outside of the light shielding plate 18 and deviated in orientation of liquid crystal molecules 9 from the vertical direction, and floating of the wholly black state due to the light leak described earlier may be caused by rotation of the polarization direction of the linearly polarized light.

However, if the periphery of the portion protruding to the outside of the light shielding plate 18 is less than 50% of the whole periphery length of the section of the spacer 8 and the height distribution of the portion protruding to the outside of the light shielding plate 18 is limited to less than 50% of the whole height of the spacer 8, then the floating of the wholly black state can be suppressed to a negligible degree especially from the viewpoint of the contrast ratio.

In the present embodiment, the light shielding area 18 has been formed between the orientation film 12 of the second substrate 4 and the pillar-shaped spacer 8. However, a similar effect can be obtained even if the light shielding area is provided on the incident light side, i.e., between the orientation film 12 and the electrode layer (opposed electrodes) 10, between the electrode layer (opposed electrodes) 10 and the second base 2, within the second base 2, or on the surface of the second base 2.

Figure 8A:
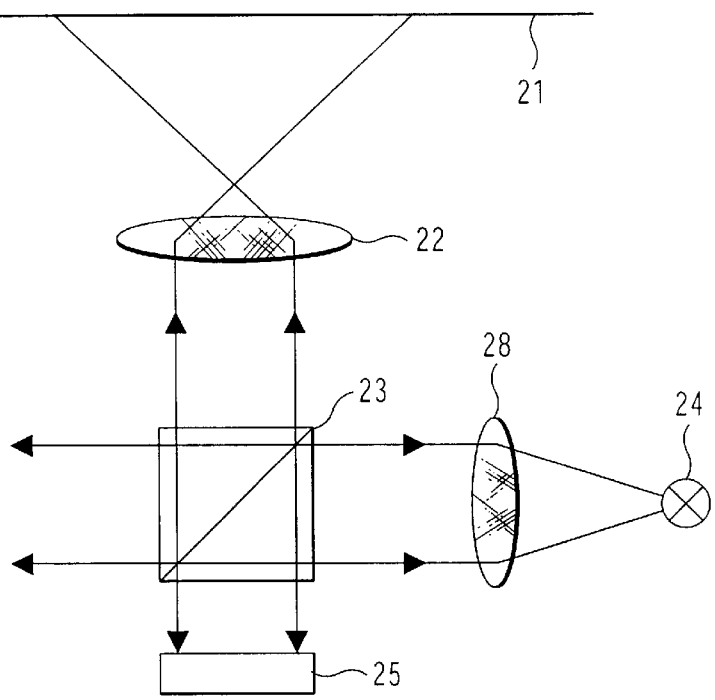
FIG. 8A is a schematic configuration diagram of an optical system formed by using an embodiment of a liquid crystal light valve of reflection type according to the present invention.

A schematic configuration of an optical system using this liquid crystal light valve of reflection type is shown in FIG. 8A. A change of polarization of light in the optical system of FIG. 8A is shown in FIG. 8B.

As shown in FIG. 8A, a light source 24, a liquid crystal light valve 25, and a projection optical system 22 are disposed around a polarization beam splitter (PBS) 23. A light from the light source 24 is made incident on the PBS 23 through a lighting optical system 28 including a lens or the like. The light is then reflected on the PBS 23, and incident on the liquid crystal light valve 25.

The light reflected within the liquid crystal light valve 25 is reflected within the PBS 23 and returned to the light source 24 side. However, a part of the light is transmitted through the PBS 23 and projected onto a screen 21 through a projection optical system 22.

Figure 8B:
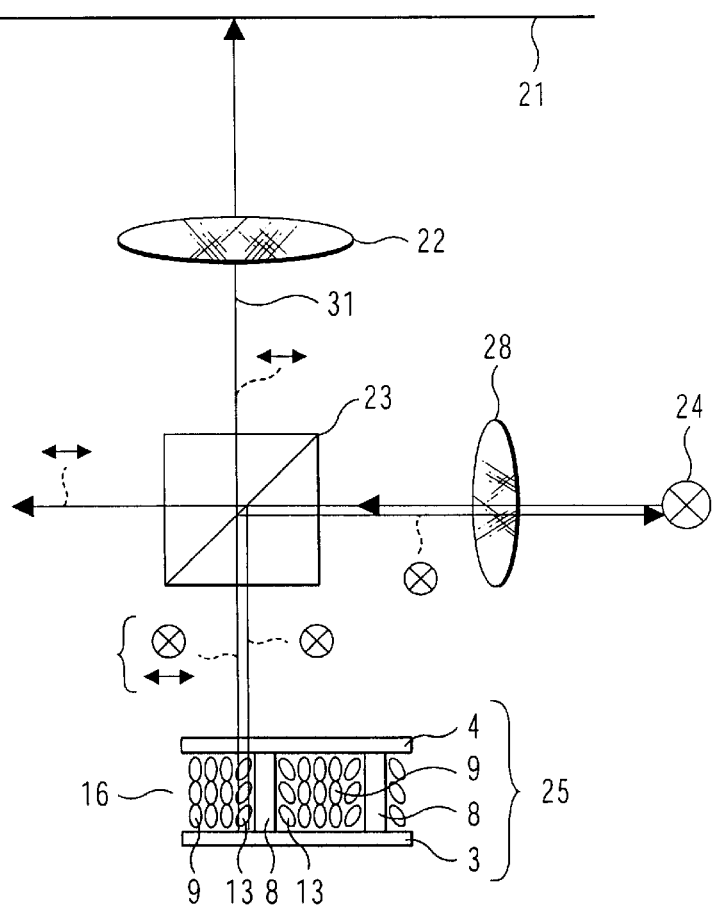
FIG. 8B is a diagram showing polarization states of light in an optical system formed by using an embodiment of a liquid crystal light valve of reflection type according to the present invention.

In this optical system, the light from the light source 24 is first converted to a parallel light by the lighting optical system 28 as shown in FIG. 8B, and further to a linearly polarized light (in a direction perpendicular to paper in FIG. 8B) when it is reflected by the PBS 23. Resultant linearly polarized light is incident on the liquid crystal light valve 25.

Within the liquid crystal light valve 25, the linearly polarized light is passed through the second substrate 4 and the liquid crystal layer 16, reflected by the dielectric reflection film 20 of the first substrate 3, and passed through the liquid crystal layer 16 again, and emitted from the second substrate 4.

If at this time the liquid crystal molecules 9 are oriented in a direction perpendicular to the substrates 3 and 4, then the polarization direction is not rotated, and the linearly polarized light having the original polarization direction (i.e., a direction perpendicular to paper in FIG. 8B) as it is emitted.

When the light is incident on the PBS 23 again, therefore, the linearly polarized light is wholly reflected and returned to the light source 24 side. Since any light does not arrive at the screen 21, the wholly black state can be implemented.

On the other hand, if the liquid crystal molecules 9 are oriented in a direction inclined from the direction perpendicular to the substrates 3 and 4, then the polarization direction is rotated, and a linearly polarized light changed in polarization direction from the original polarization direction is obtained. For example, in FIG. 8B, the polarized light having a component perpendicular to the paper and a component in the lateral direction is presented and then emitted.

Such polarized light is incident on the PBS 23 again. Then, the component in the direction perpendicular to the paper is reflected by the PBS and returned to the light source 24 side. However, the component in the lateral direction is transmitted through the PBS 23 and directed to the projection optical system 28. As a result, the light projection onto the screen 21 is conducted, and an image is displayed by the light projected onto the screen 21.

In other words, in the configuration of the normally white mode, the liquid crystal molecules 9 are oriented in a direction inclined from the direction perpendicular to the substrates 3 and 4, when no voltage is applied. In the configuration of the normally black mode, the liquid crystal molecules 9 are oriented in a direction inclined from the direction perpendicular to the substrates 3 and 4, when a voltage is applied. As described above, therefore, an image is displayed on the screen 21.

In the case where the liquid crystal molecules should originally be oriented in the direction perpendicular to the substrates 3 and 4, orientation of the liquid crystal molecules 13 in the vicinity of the spacer 8 is inclined from the direction perpendicular to the substrates 3 and 4 and disturbed. Accordingly, the polarization direction of light 15 passing through an area of the liquid crystal layer 16 where the orientation of the liquid crystal molecules 13 is disturbed is rotated. In the same way as the above described time when an image is displayed, therefore, a component in the lateral direction in FIG. 8B is generated.

Since the component in the lateral direction is transmitted through the PBS 23, the above described floating of the wholly black state, i.e., light leak in the wholly black state is caused.

If the light 15 passing through the area where the orientation of the liquid crystal molecules 13 is disturbed is intercepted by the light shielding plate 18 in the present embodiment, therefore, generation of the component in the lateral direction in FIG. 8B can be suppressed and consequently the light leak can be suppressed.

The liquid crystal light valve in the present embodiment can be fabricated, for example, by the following manner.

Figure 9A:
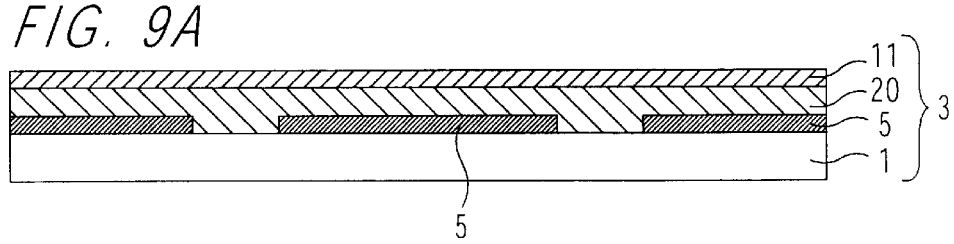
FIGS. 9A, 9B and 9C are diagrams showing a former half of a fabrication process of an embodiment of a liquid crystal light valve of reflection type according to the present invention.

First of all, on a first base 1 made of, for example, glass, an electrode layer 5 serving as a pixel electrode is, for example, selectively formed so as to form a matrix at every pixel, as shown in FIG. 9A. Furthermore, on this electrode layer 5, for example, a dielectric reflection film 20 is formed as a reflection film. On the dielectric reflection film 20, an orientation film 11 is formed. In this way, a first substrate 3 is formed.

Figure 9B:
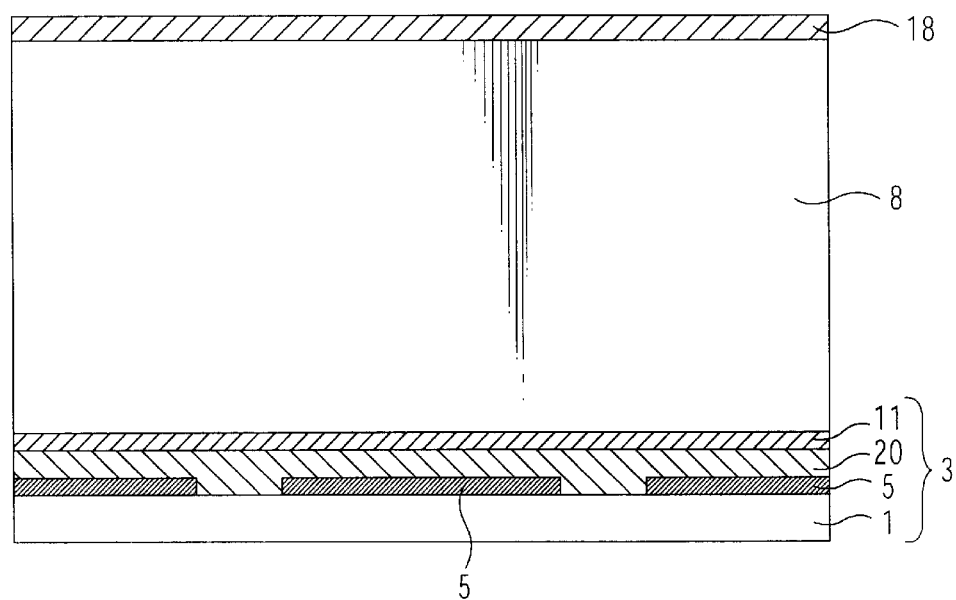

Subsequently, as shown in FIG. 9B, a spacer 8 made of, for example, a resin or the like is formed on the orientation film 11 of the first substrate 3. On the spacer 8, a light shielding plate 18 is formed which is made of a film of metal such as Cr, W, Al, Ni, Cu, Ti and so on.

Figure 9C:
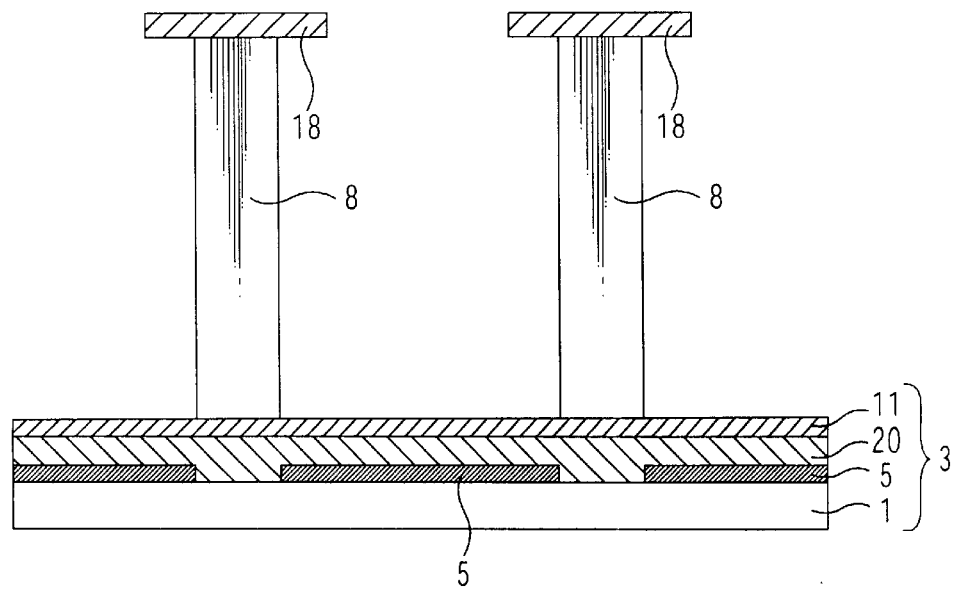

Subsequently, as shown in FIG. 9C, the light shielding plate 18 and the spacer 8 are consecutively etched by using a resist pattern which is not illustrated as a mask. Thereafter, the spacer 8 is further selectively subject to the side etching. As a result, the section of the spacer 8 can be made smaller than that of the light shielding plate 18.

Depending upon the state of the consecutive etching and side etching at this time, a part of the spacer 18 is sometimes formed so as to protrude from the light shielding plate 18 as shown in FIG. 6.

Figure 10A:
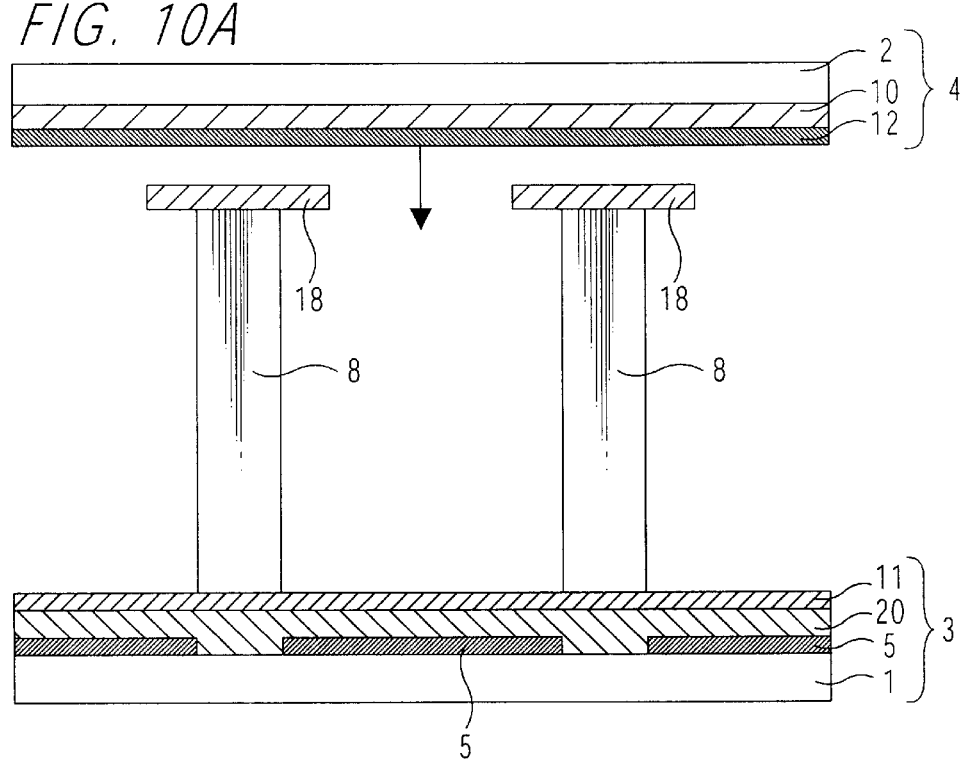
FIGS. 10A and 10B are diagrams showing a latter half of a fabrication process of an embodiment of the liquid crystal light valve of reflection type according to the present invention.

As shown in FIG. 10A, on a second base 2 made of, for example, glass, an electrode layer 10 and an orientation film 12 are consecutively formed to thereby form a second substrate 4, and this second substrate 4 is connected on the first substrate 3 formed with the spacer 8 via the light shielding plate 18 located on the top of the spacer 8, and simultaneously pressed.

Figure 10B:
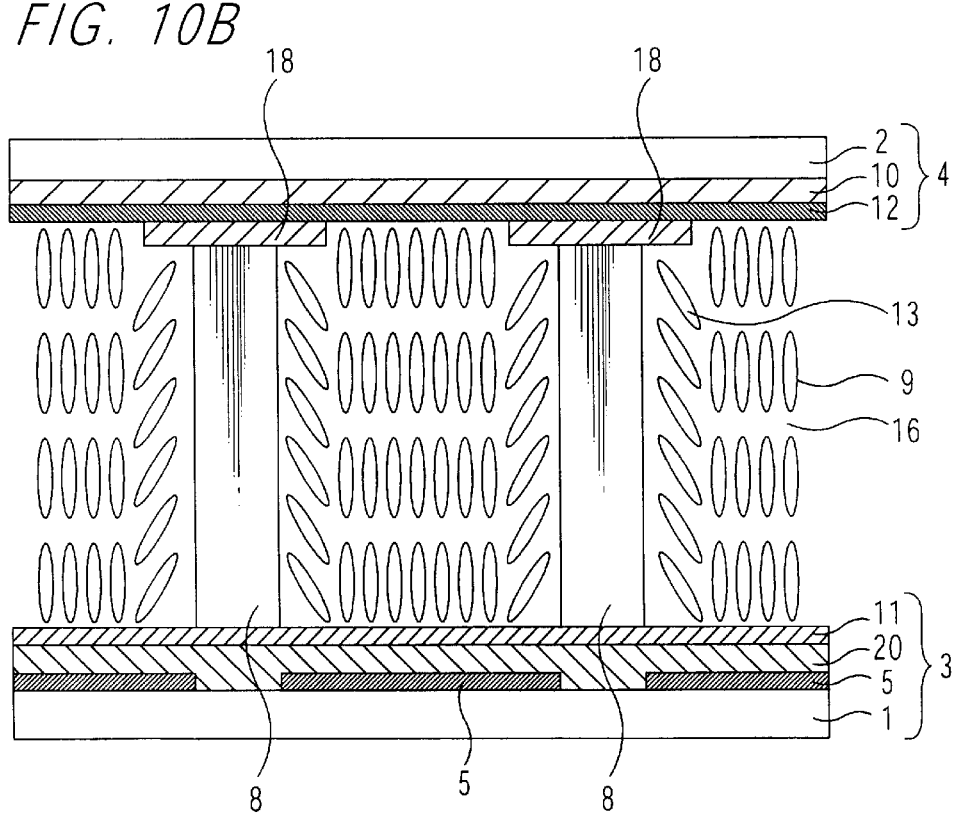

Finally, in this state, a liquid crystal is injected, for example, in a vacuum to form a liquid crystal layer 16 filled with liquid crystal molecules 9 as shown in FIG. 10B. A liquid crystal light valve apparatus of reflection type can be thus fabricated. At this time, liquid crystals 13 in the vicinity of the spacer 8 are disturbed in orientation as described earlier.

In the liquid crystal light valve of the present embodiment described above, the light shielding plate 18 is formed on the incident light side of the spacer 8 so as to contain the spacer 8 in the light shielding plate 18 in at least 50% of the whole height of the spacer 8. Thus, as compared with the case where the light shielding plate 18 is not provided as shown in FIG. 3, it becomes possible to decrease the incident light passing through the liquid crystal molecules 13 located in the vicinity of the spacers 8 and disturbed in orientation thereof.

As a result, it becomes possible to suppress the above described light leak caused by the incident light 14 passing through the liquid crystal molecules 13 disturbed in orientation.

In other words, it becomes possible to suppress the floating of the wholly black state, improve the contrast, and improve the image quality.

Furthermore, the process added to form the light shielding plate 18 is few, and by the above described consecutive etching or the like, the light shielding plate 18 can be formed with high reproducibility.

As a result, the yield of the liquid crystal light valve can be increased and the fabrication cost can be reduced.

Figure 11:
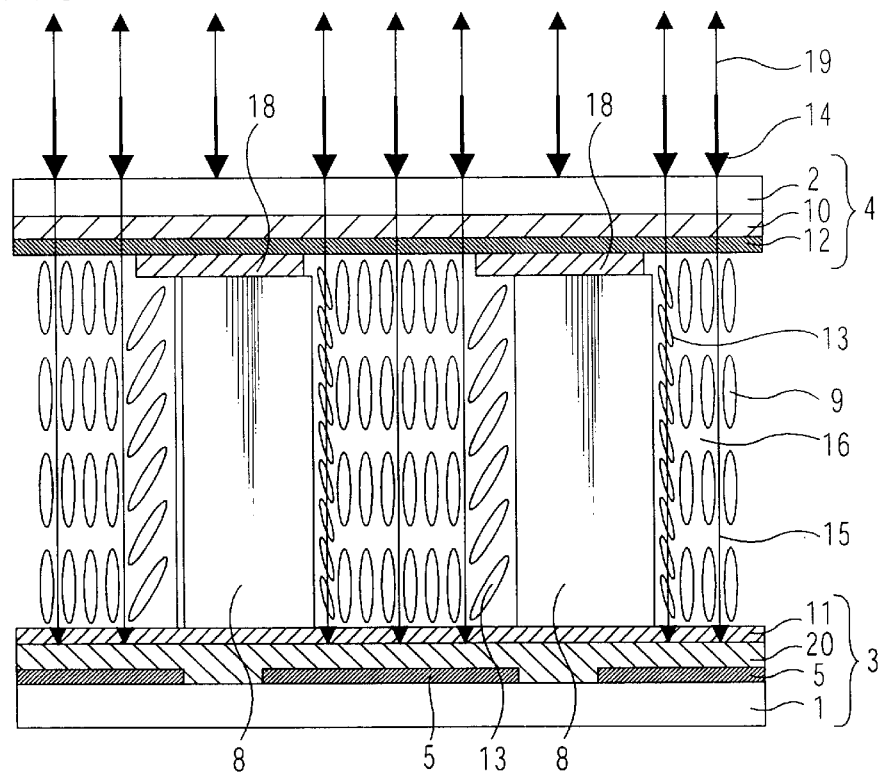
FIG. 11 is a schematic sectional view of another embodiment of the liquid crystal light valve of reflection type according to the present invention.

FIG. 11 shows a schematic sectional view of another embodiment of the liquid crystal light valve according to the present invention.

In the present embodiment, an area of the pillar-shaped spacer 8 which is not contained in the light shielding area formed by the light shielding plate 18 is formed over the whole height of the spacer 8, i.e., over the whole area of the optical axis direction of the incident light.

In other words, out of the above described periphery of the two-dimensional shape obtained by projecting the section of the spacer 8 perpendicular to its optical axis direction onto the light shielding plate 18, a part thereof is contained in the light shielding plate 18 over the whole area of the optical axis direction of the incident light.

That is, in each of two spacers 8 shown in FIG. 11, its right end portion protrudes from the light shielding plate 18 over the whole height.

Therefore, in the vicinity of the right end portion of the spacer 8, therefore, the incident light passes near the liquid crystal molecules 13 disturbed in orientation.

In other words, there is a fear that the polarization direction of the linearly polarized light passing through this area may be rotated and floating in the wholly black state may be caused by the light projected onto the screen.

In the present embodiment, therefore, the periphery length of the portion of the spacer 8 protruding from the light shielding plate 18 is made less than 50% of the whole periphery length of the section of the spacer 8. As a result, the floating of the wholly black state can be suppressed to a negligible level from the viewpoint of the contrast on the screen.

Since other components of the configuration are similar to those of the embodiment shown in FIG. 6, they are denoted by like reference numerals and their duplicated description will be omitted. In embodiments hereafter described as well, duplicated description will be omitted.

Figure 12:
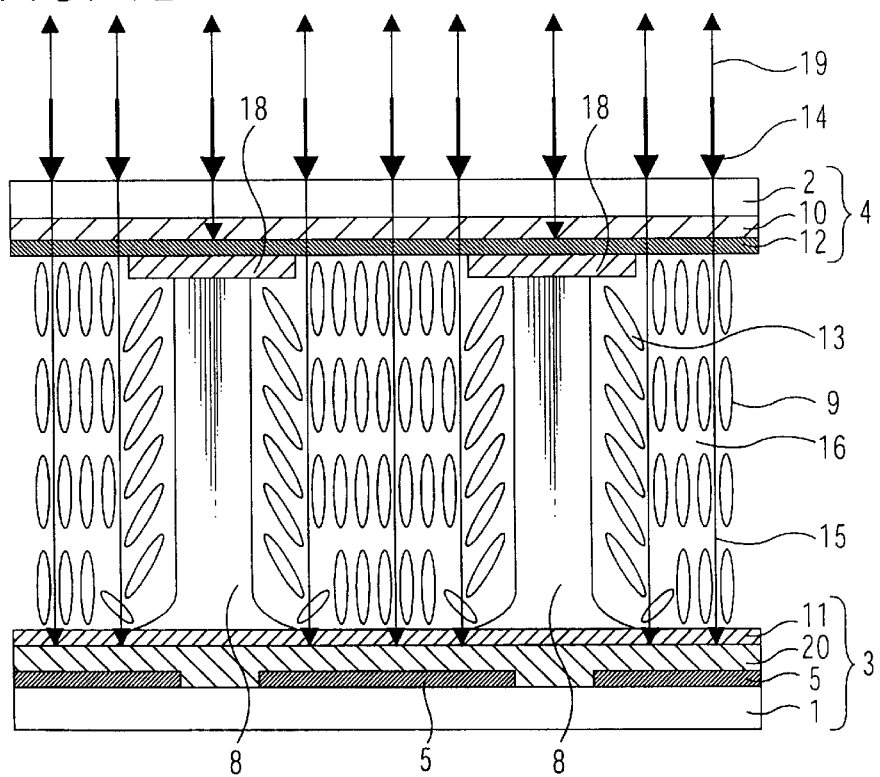
FIG. 12 is a schematic sectional view of still another embodiment of the liquid crystal light valve of reflection type according to the present invention.

FIG. 12 shows a schematic sectional view of a still another embodiment of the liquid crystal light valve according to the present invention.

In the present embodiment, a part of the pillar-shaped spacer 8 is formed so as to protrude from the light shielding plate 18 over the whole periphery of the section.

In other words, in an area of a part of the spacer 8 in the height of the optical axis direction of the incident light, the whole of the two-dimensional shape obtained by projecting the section of the spacer 8 perpendicular to the optical axis direction is contained in the light shielding plate 18.

In other words, in each of the illustrated two spacers 8, a portion (a bottom portion) contacting the orientation film 11 of the first substrate 3 protrudes from the light shielding plate 18 over the whole periphery. The remaining portion of the spacer 8 is contained in the light shielding plate 18 over the whole periphery.

In the vicinity of the bottom portion of the spacer 8, therefore, the incident light passes near the liquid crystal molecules 13 disturbed in orientation.

In other words, there is a fear that the polarization direction of the linearly polarized light passing this area may be rotated and floating in the wholly black state may be caused by light projected onto the screen.

In the present embodiment, therefore, the spacer 8 is contained in the light shielding plate 18 over an area occupying equal to or more than 50% of the spacer 8 in the height direction thereof, and such a portion that the spacer 8 protrudes from the light shielding plate 18 over a part or the whole periphery is made less than 50% in the height direction. As a result, the floating of the wholly black state can be suppressed to a negligible level from the viewpoint of the contrast on the screen.

Figure 13:
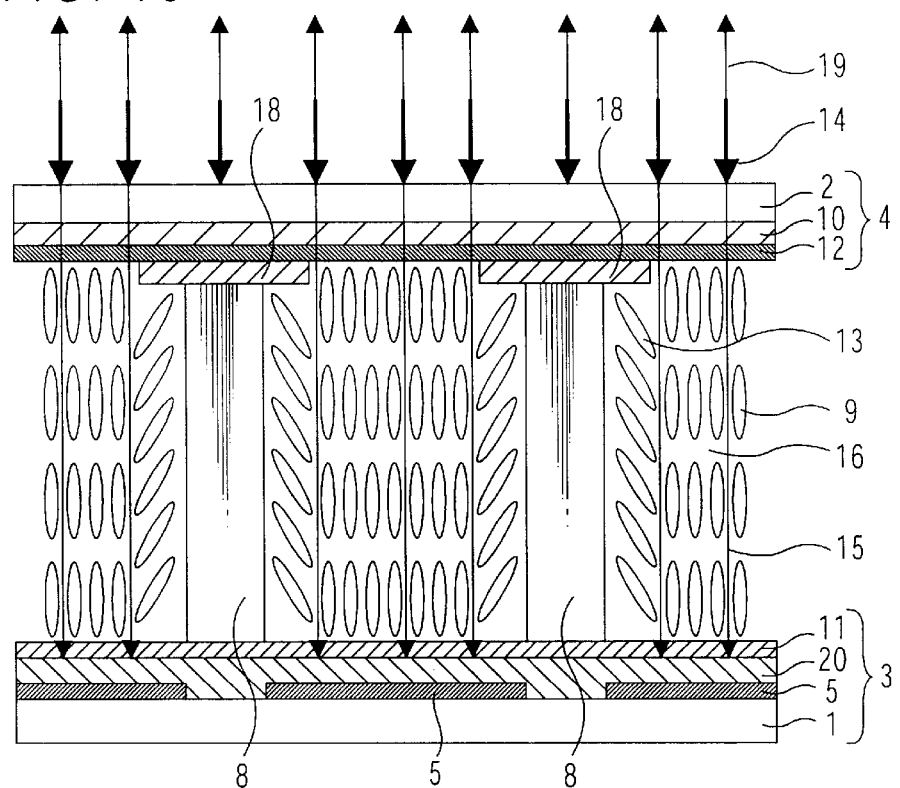
FIG. 13 is a schematic sectional view of yet another embodiment of the liquid crystal light valve of reflection type according to the present invention.

FIG. 13 is a schematic sectional view of an yet another embodiment of the liquid crystal light valve according to the present invention.

In the liquid crystal light valve of the present embodiment, the pillar-shaped spacer 8 is contained in the light shielding plate 18 over the whole height thereof.

In this case, the spacer 8 is contained in the light shielding plate 18 over the whole height. Therefore, it becomes possible to completely prevent the influence of rotation of linearly polarized light caused by disturbance of the liquid crystal orientation on the side surface of the spacer 8. Thus, the perfect wholly black state can be implemented. As a result, the most ideal situation from the viewpoint of the contrast of the image projected onto the screen can be implemented.

In each of the embodiments heretofore described, the present invention has been applied to liquid crystal light valves of reflection type. The present invention can be applied to liquid crystal light valves of transmission type as well in the same way.

Figure 14:
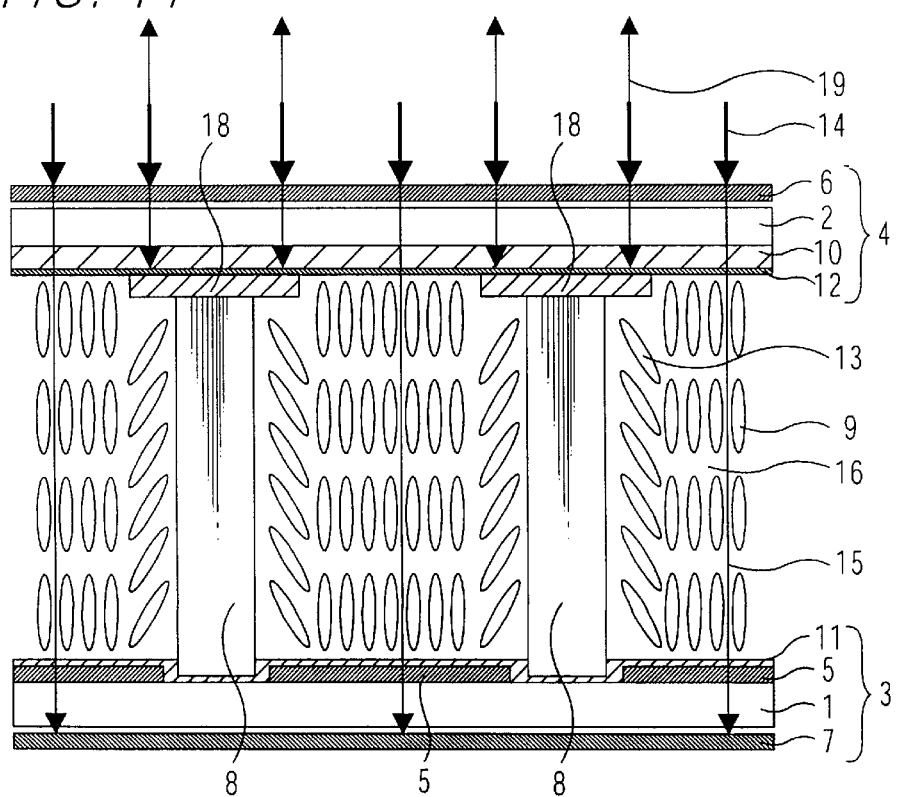
FIG. 14 is a schematic sectional view of an embodiment of the liquid crystal light valve of transmission type according to the present invention.

FIG. 14 shows a schematic sectional view of another embodiment of the liquid crystal light valve according to the present invention.

The liquid crystal light valve of the present embodiment is formed by forming the orientation film 11 directly on the electrode layer 5 serving as pixel electrodes without providing the dielectric reflection film 20 which has been formed in the liquid crystal light valves of reflection film.

Two polarization plates provided on a light incidence surface side of the second base 2 and on a light emission side of the first base 1, i.e., a polarization plate 6 provided on the second base 2 and an analyzer plate 7 provided on a rear surface of the first base 1 are formed in the so-called cross Nicol state so as to be perpendicular to each other.

Furthermore, in the present embodiment, a surface of the spacer 8 contacting the first substrate 3 is located between the pixel electrodes 5 on the surface of the first substrate 3, and the spacer 8 is connected to the first base 1 via only the orientation film 11.

The electrode layer (pixel electrode) 5 forming the function element is formed so as to be able to electrically adjust the light transmission factor of each pixel by applying a voltage via, for example, a TFT (thin film transistor).

By virtue of this configuration, a readout light (incident light) 14 injected from the outside of the second substrate 4 is passed through the liquid crystal layer 16 (as represented by 15 in FIG. 14), modulated by the above described adjustment of the light transmission factor when it is transmitted through the first substrate 3, and emitted through the first substrate 3.

In other words, a liquid crystal light valve of active matrix scheme is formed.

In the liquid crystal light valve of transmission type as well, the liquid crystal light valve of the present embodiment makes it possible to intercept the incident light 14 by the light shielding plate 18 and prevent the incident light from passing through the vicinity of the liquid crystal molecules 13 located near the spacer 8 and disturbed in orientation, in the same way as the case of the above described reflection type. As a result, the light leak mentioned above can be suppressed.

The present invention can be applied to a liquid crystal light valve of light writing scheme as well. Its case will now be described.

Figure 15:
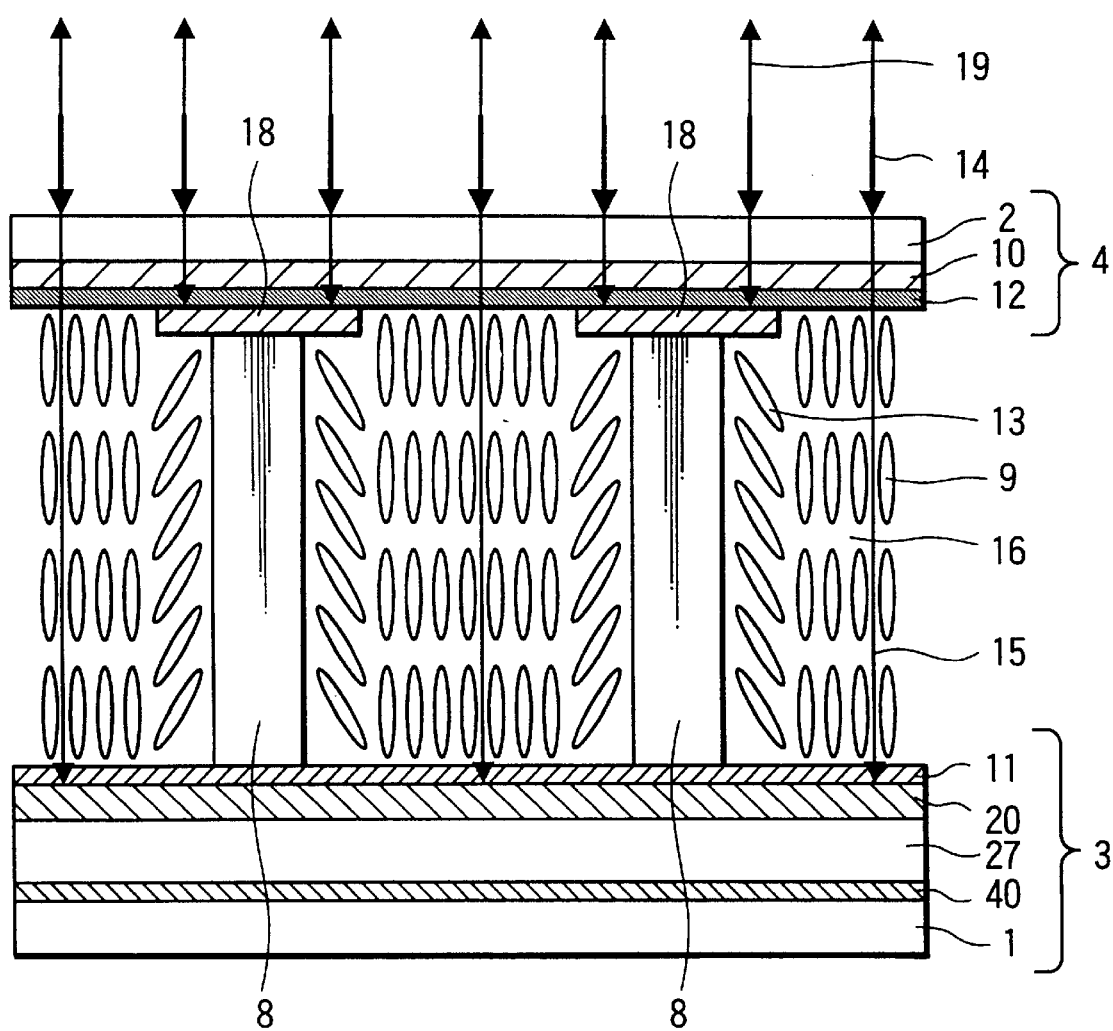
FIG. 15 is a schematic sectional view of an embodiment of the liquid crystal light valve of reflection type using a light writing method according to the present invention.

FIG. 15 shows a schematic sectional view of another embodiment of the liquid crystal light valve according to the present invention.

In the present embodiment, an electrode layer 40 is formed on a first base 1 made of, for example, glass. On the electrode layer 40, a photoconductive layer 27 is formed. On the surface of the photoconductive layer 27, a dielectric reflection film 20 is formed. On the surface of the dielectric reflection film 20, an orientation film 11 is formed. In this way, a first substrate 3 is formed.

In the same way as the above described embodiments, a pillar-shaped spacer 8 is formed on the orientation film 11.

On the other hand, on a second base 2 made of, for example, glass, an electrode layer (opposed electrode) 10 and an orientation film 12 are formed in the same way. Thus, a second substrate 4 is formed.

The first substrate 1 and the second substrate 2 are disposed so as to oppose their orientation films 11 and 12 to each other, and pressed. Between the orientation films 11 and 12, a liquid crystal is injected so that a liquid crystal layer 16 filled with liquid crystal molecules 9 is formed to thereby form a liquid crystal light valve.

Furthermore, in the present embodiment, the spacer 8 is formed so as to be contained in the light shielding plate 18 over the whole height as same as represented in FIG. 13.

The photoconductive layer 27 can be formed of, for example, thick, continuous, homogeneous amorphous silicon or the like.

As for the photoconductive layer 27 formed in an image area of the first substrate 3 to serve as a function element, the property of the photoconductive layer 27 is changed by conducting the light writing from the rear surface side of the first substrate 3, i.e., from the outside of the first base 1.

By virtue of this configuration, a readout light (incident light) 14 injected from the outside of the second substrate 4 is passed through the liquid crystal layer (as represented by 15 in FIG. 6), modulated by the change of the property of the photoconductive layer 27 when it is reflected on the dielectric reflection film 20 of the first substrate 3, and emitted through the second substrate 4 (as represented by 19 in FIG. 6).

In other words, a liquid crystal light valve of reflection type using the light writing scheme is formed.

In the present embodiment as well, it is possible to intercept the incident light 14 by the light shielding plate 18 and prevent the incident light from passing through the vicinity of the liquid crystal molecules 13 located near the spacer 8 and disturbed in orientation, in the same way as the above described embodiments of reflection type using the active matrix scheme. As a result, the light leak described above can be suppressed.

Figure 16:
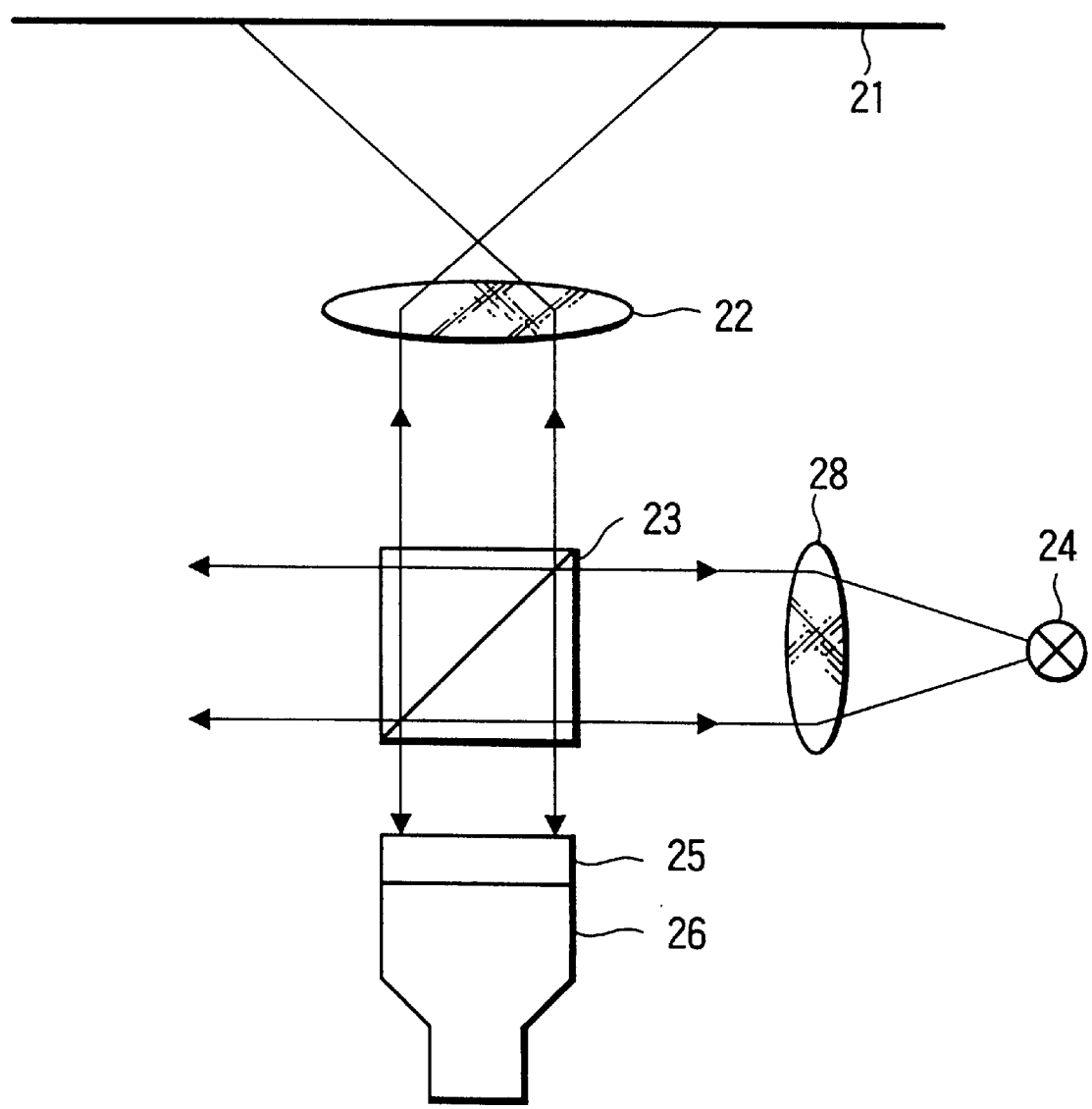
FIG. 16 is a schematic configuration diagram of an optical system formed by using a liquid crystal light valve of reflection type using a light writing method according to the present invention.

An optical system using the liquid crystal light valve of reflection type with the light writing scheme of the present embodiment is shown in FIG. 16.

As shown in FIG. 16, a CRT (cathode-ray tube) 26 is disposed on the rear surface side of a liquid crystal light valve 25 as a light source for the writing light. The rest of the configuration is the same as that of the optical system shown in FIG. 8A.

A light emitted from the light source 24 is first converted to a parallel light by a lighting optical system 28, incident on a PBS 23, converted to a linearly polarized light therein, and incident on the liquid crystal light valve 25.

If in this state a light writing is conducted from the rear surface side of the liquid crystal light valve 25, i.e., the first base 1 side by using a light source such as the CRT 26 or the like, this writing light enters an area of the photoconductive layer 27. Since the resistance value of the area of the photoconductive layer 27 on which the light is incident is lowered, a voltage is applied to the liquid crystal layer 16.

As a result, the liquid crystal molecules 9 are oriented vertically. In the same way as the case of the active matrix scheme described earlier with reference to FIG. 8, the linearly polarized light incident on the second base 2 is reflected on the PBS 23, and returned to the light source 24. Accordingly, the wholly black state can be implemented on a screen 21.

By the way, in each of the embodiments heretofore described, the light shielding area is formed by the light shielding plate 18 made of, for example, a metal layer or the like. However, other configurations may be adopted.

Other configurations of the light shielding area will now be described.

For the purpose of further raising the luminance of the display devices of projection type, the power of light incident on the liquid crystal light valve tends to become increasingly larger.

When reflecting the light on the light shielding area, therefore, there should be adopted a material and a configuration capable of making the reflection factor high as far as possible and preventing heat storage in devices which aggravates characteristics of especially the liquid crystal of the liquid crystal light valve apparatus.

Therefore, it is necessary to make the reflection on the light shielding area larger and decrease the absorption therein. By doing so, a change and degradation of characteristics can be prevented.

In another form of the light shielding area, the light shielding area is formed of a light reflective material such as a metal reflection film, a dielectric reflection film obtained by alternately stacking two kinds of dielectrics differing in refractive index at intervals of nearly ¼λ (where λ is the wavelength of incident light) or the like. Alternatively, the light shielding area is formed by using a structure obtained by combining them, i.e., a structure obtained by stacking the dielectric reflection film on the metal film.

As a result, the light shielding area can be formed so as to reflect the incident light and prevent absorption of the incident light by using a light reflective material such as a metal reflection film, a dielectric reflection film or the like. And a change of characteristics or the like due to heat storage in the liquid crystal light valve apparatus can be prevented.

As another form of the light shielding area, there can be adopted such a configuration as to positively absorb a light in the light shielding area and prevent the light from returning to the PBS.

In this case, there is a fear of heat storage in the liquid crystal light valve. In the case of, for example, the liquid crystal light valve of reflection type, a cooling device using, for example, the Peltier effect may be provided therearound or in contact with its bottom surface to cope with this.

For the purpose of the above described light absorption, the light shielding area is formed by using a film of a light absorbing material such as a black carbon film or the like or a laminate film formed by stacking a light transmission film on a light absorbing material such as carbon or the like.

In this configuration, the light transmission film may be formed of a laminate film obtained by alternately stacking two layers differing in refractive index at an interval of nearly ¼λ (where λ is the wavelength of incident light).

As still another form of the light shielding area, there can be adopted such a method that the light shielding area is formed of a light scattering material and the incident light is scattered in the light shielding area, thereby significantly weakened in light intensity, and returned to the PBS. In this case as well, a similar effect can be obtained.

As an yet another form of the light shielding area, there can be adopted such a light shielding plate of a laminate structure that a reflection film is formed on the light incidence side and a light absorption film is formed on the opposite side.

As a result, the incident light can be reflected more positively. Furthermore, so as to prevent a light incident on the vicinity of edge of the light shielding plate and reflected again on the rear surface of the light shielding plate from being emitted through the second base and causing the floating of the wholly black state, the light incident on the vicinity of edge of the light shielding plate can be absorbed quickly by the absorption film on the rear surface of the light shielding plate. As a result, leak light can be prevented more certainly.

In this configuration, a laminate of the reflection film and the dielectric reflection film may be formed on the absorption film.

Figure 17:
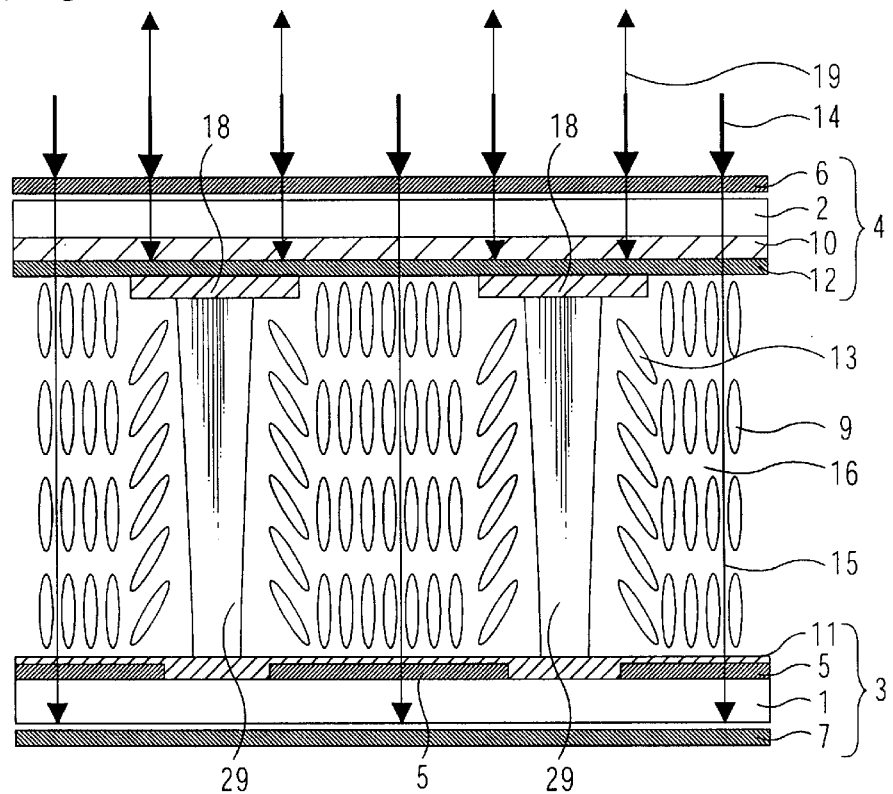
FIG. 17 is a schematic sectional view showing an embodiment of the present invention in which a spacer is formed so as to be tapered.

FIG. 17 shows a schematic sectional view of a further embodiment of the liquid crystal light valve according to the present invention.

According to the present embodiment, in the liquid crystal light valve of reflection type, a spacer 29 is formed so as to take an inverted taper shape, that is, the section area of the spacer 29 becomes large in the vicinity of the light shielding plate 18, and becomes small in the vicinity of the first substrate 3.

As a result, the liquid crystal molecules 13 disturbed in orientation get away from the incident light especially in the vicinity of the first substrate 3. Thus, the influence on the polarization of the incident light is further decreased.

Therefore, the effect of preventing the wholly black state from floating is further enhanced.

In the same way, although not illustrated, such a structure that the section area of the spacer 8 is small in the vicinity of the second base 2 and the side of the light shielding plate 18 may be adopted. Or there may be adopted such a structure that the section area of the spacer 8 in the center is large and the section area of spacer 8 is small at the top and bottom ends thereof. Or its inverted structure may be adopted.

Furthermore, such a structure that the thickness change of the spacer 8 takes a curved shape other than the linear shape may also be adopted.

Figure 18:
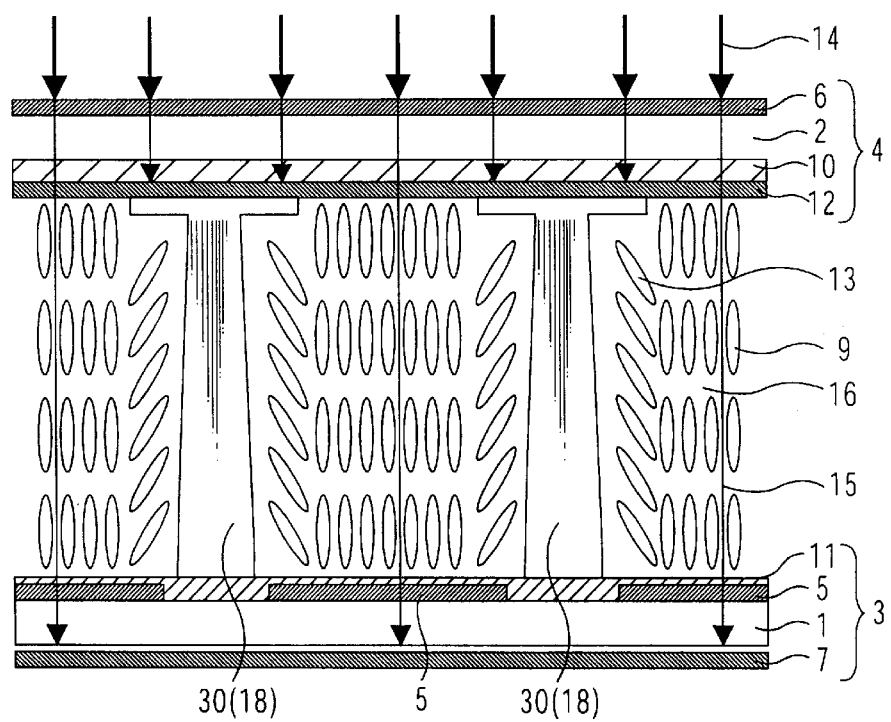
FIG. 18 is a schematic sectional view showing an embodiment of the present invention in which the spacer is formed integrally with a light shielding plate.

FIG. 18 is a schematic sectional view of another embodiment of the liquid crystal light valve according to the present invention.

In the liquid crystal light valve of the present embodiment, a pillar-shaped spacer 30 is formed on the side of the first substrate 3. Thereafter, the temperature of the opposed second substrate 4 is set to, for example, equal to or higher than the softening point of the spacer 30. Thus, when the both substrates 3 and 4 are pressed against each other, the front end of the spacer 30 melts and spreads. As a result, the light shielding plate 18 is formed of the same material as that of the spacer 30, and formed on the top of the spacer 30. The section of the spacer 30 is contained in the light shielding plate 18 over the whole periphery.

In other words, the light shielding plate 18 is formed integrally with the spacer 30.

As compared with the case where the light shielding plate 18 and the spacer are formed independently, therefore, the fabrication cost can be reduced owing to the reduction in the number of processes.

Such a configuration that the light shielding area 18 and the spacer 8 are formed separately by using the same material may also be adopted. In this case as well, reduction of material cost and simplification of the process become possible.

In each of the embodiments heretofore described, the case where the incident light 14 is incident on the second substrate 4 vertically has been described. However, there may be adopted such a configuration that the incident light is incident on the second substrate obliquely and accordingly the pillar-shaped spacer is also formed obliquely so as to correspond to the direction of the incident light.

In this case as well, a light shielding area is provided on the incident light side as compared with the end of the spacer located near the second substrate, i.e., on the second substrate 2 side. As for the two-dimensional shape obtained by projecting the section of the spacer perpendicular to the optical axis direction (in this case, the optical axis is oblique to the second substrate) of the incident light onto the light shielding area in parallel to the optical axis, a part or the whole of its periphery should be contained in the light shielding area.

By providing the light shielding area on the second substrate side of the spacer, i.e., on the incident light side, the incident light is intercepted by the light shielding area. As a result, it is possible to suppress the floating of the wholly black state caused by the incident light passing through an area located near the spacer and disturbed in orientation of liquid crystal molecules.

There also may be conceivable such a configuration that the configuration of the present invention is modified and a light shielding area is provided on the first base side as compared with the end of the pillar-shaped spacer contacting the first substrate.

In this case, however, the light is incident once on an area located in the vicinity of liquid crystal molecules disturbed in orientation. By considering that the light incident on this area spreads to some extent, it is necessary to make the light shielding area slightly larger. The effective area of each pixel is narrowed by that value. In the reflection type, there is needed such a configuration that the light incident on the light shielding area is not reflected, but absorbed entirely.

In other words, the configuration of the present invention in which the light shielding area is provided on the incident light side of the pillar-shaped spacer brings about a greater light leak suppression effect, a wider effective pixel area, and more excellent characteristics of liquid crystal light valve apparatuses.

The liquid crystal light valve of the present invention is not restricted to the above described embodiments, but various other configurations can be taken without departing from the spirit of the present invention.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A liquid crystal light valve comprising:
   a first substrate having a function element and an orientation film formed on a first base;
   a second substrate having an opposed electrode and an orientation film formed on a second base, said second substrate disposed opposite said first substrate;
   a spacer disposed between said first substrate and said second substrate;
   a liquid crystal layer between said first substrate and said second substrate; and
   a light shielding area on an incident light side of said second substrate and above said spacer,
   wherein, for suppressing light leak caused by liquid crystal molecules in the vicinity of said spacer and disturbed in orientation, said spacer defines a spacer periphery that projects as a two-dimensional shape onto said light shielding area in the direction of incident light, such that said two-dimensional shape is approximately contained in said light shielding area and extends partially outside said light shielding area due to a protrusion,
   and wherein said spacer periphery includes said protrusion and a recess, said recess filled with a portion of said liquid crystal molecules disturbed in orientation.

2. A liquid crystal light valve according to claim 1, wherein said function element is made to be able to electrically adjust light transmission factor of each pixel, and said liquid crystal light valve is such a liquid crystal light valve of transmission type that a readout light injected from said first substrate side is modulated through said second substrate, transmitted and emitted.

3. A liquid crystal light valve according to claim 1, wherein each function element is set to be able to change a reflection factor of each pixel for said incident light in response to a voltage individually given from an output terminal, and said liquid crystal light valve is such a liquid crystal light valve of reflection type that a readout light injected from outside of said second substrate is modulated when it is reflected on said first substrate due to a change of said reflection factor, and emitted through said second substrate.

4. A liquid crystal light valve according to claim 1, wherein said function element is adapted to conduct a light writing on a photoconductive layer formed in a pixel area located on a rear surface of said first substrate and thereby change a property of said photoconductive layer, and said liquid crystal light valve is such a liquid crystal light valve of reflection type that a readout light injected from outside of said second substrate is modulated when it is reflected on said first substrate due to a change of the property of said photoconductive layer, and emitted through said second substrate.

5. A liquid crystal light valve according to claim 1, wherein said light shielding area is formed of a light reflective material which does not transmit a light.

6. A liquid crystal light valve according to claim 1, wherein said light shielding area is formed of a dielectric reflection film.

7. A liquid crystal light valve according to claim 6, wherein said dielectric reflection film is formed by stacking two light transmission layers differing in refractive index with a thickness equal to a ¼ of a wavelength of said incident light.

8. A liquid crystal light valve according to claim 1, wherein said light shielding area is formed of a light absorbing material which does not transmit a light.

9. A liquid crystal light valve according to claim 1, wherein said light shielding area is formed by stacking a light transmission film on a light absorbing material.

10. A liquid crystal light valve according to claim 9, wherein said light transmission film is formed by stacking two light transmission layers differing in refractive index with a thickness equal to a ¼ of a wavelength of said incident light.

11. A liquid crystal light valve according to claim 1, wherein said light shielding area is formed by stacking a light reflective material on a light absorbing material.

12. A liquid crystal light valve according to claim 1, wherein said light shielding area is formed by stacking a light reflective material and a dielectric reflection film on a light absorbing material.

13. A liquid crystal light valve according to claim 1, wherein said light shielding area is formed of a light scattering material.

14. A liquid crystal light valve according to claim 1, wherein said two-dimensional shape extends partially outside said light shielding area due to at least one additional protrusion.

15. A liquid crystal light valve according to claim 1, wherein the periphery is oblique, and wherein the spacer changes in cross sectional area along the direction of the incident light.

16. A liquid crystal light valve according to claim 14, wherein a height of said protrusion extending outside said light shielding area is less than 50 percent of a height of said spacer.

17. A liquid crystal light value according to claim 14, wherein a periphery of said protrusion extending outside said light shielding area is less than 50 percent of said spacer periphery.

18. A liquid crystal light value according to claim 1, wherein said function element is a pixel light-transmission adjustment function element, and wherein said liquid crystal light valve is a transmission liquid crystal light valve in which said second substrate is a modulating substrate for modulating injected readout light.

19. A liquid crystal light valve according to claim 1, wherein said functional element is a voltage responsive function element, and wherein said liquid crystal light valve is a reflective liquid crystal light valve in which said first substrate is a modulating substrate for modulating readout light injected through said second substrate and emitted through said second substrate.

20. A liquid crystal light valve according to claim 1, wherein said function element is a photoconductive layer formed in a pixel area on a surface of said first substrate, and wherein said liquid crystal light valve is a reflective liquid crystal light valve in which said first substrate is a modulating substrate for modulating readout light injected through said second substrate and emitted through said second substrate.

21. A liquid crystal light valve according to claim 1, wherein said light shielding area comprises a non-transmissive light reflective material.

22. A liquid crystal light valve according to claim 1, wherein said light shielding area comprises a dielectric reflection film.

23. A liquid crystal light valve according to claim 22, wherein said dielectric reflection film comprises at lest two stacked light transmission layers differing in refractive index and with a thickness approximately one-quarter wavelength of said incident light.

24. A liquid crystal light valve according to claim 1, wherein said light shielding material comprises non-transmissive light absorbing material.

25. A liquid crystal light valve according to claim 1, wherein said light shielding area comprises a light transmission film stacked with a light absorbing material.

26. A liquid crystal light valve according to claim 25, wherein said light transmission film comprises at least two stacked light transmission layers differing in refractive index with a thickness approximately one-quarter of a wavelength of said incident light.

27. A liquid crystal light valve according to claim 1, wherein said light shielding areas comprises a light reflective material stacked with a light absorbing material.

28. A liquid crystal light valve according to claim 1, wherein said light shielding area comprises a light reflective material stacked with a dielectric reflection film stacked with a light absorbing material.

29. A liquid crystal light valve according to claim 1, wherein said light shielding area comprises a light scattering material.

30. A liquid crystal light valve according to claim 1, wherein a cross-sectional shape of said spacer is at least one of a circle, ellipse, and a rhombus.

31. A liquid crystal light valve according to claim 1, wherein said spacer and said light shielding area comprise identical material.

32. A liquid crystal light valve according to claim 1, wherein said spacer is integral with said light shielding area and wherein said spacer and said light shielding area comprise identical material.

* * * * *